(12) United States Patent
Green et al.

(10) Patent No.: US 11,138,633 B2
(45) Date of Patent: Oct. 5, 2021

(54) SYSTEMS, METHODS AND PROGRAM PRODUCTS FOR DISTRIBUTING PERSONALIZED CONTENT TO SPECIFIC ELECTRONIC NON-PERSONAL PUBLIC OR SEMI-PUBLIC DISPLAYS

(71) Applicant: Place Exchange, Inc., New York, NY (US)

(72) Inventors: Kevin Green, Astoria, NY (US); Gordon Diggs, Brooklyn, NY (US); Yehuda Ari Buchalter, Forest Hills, NY (US); Nitin Shriram, Edison, NJ (US)

(73) Assignee: Place Exchange, Inc., New York, NY (US)

( * ) Notice: Subject to any disclaimer, the term of this patent is extended or adjusted under 35 U.S.C. 154(b) by 48 days.

(21) Appl. No.: 16/670,484

(22) Filed: Oct. 31, 2019

(65) Prior Publication Data

US 2020/0273072 A1    Aug. 27, 2020

Related U.S. Application Data

(60) Provisional application No. 62/808,445, filed on Feb. 21, 2019.

(51) Int. Cl.
  *G06Q 30/00* (2012.01)
  *G06Q 30/02* (2012.01)
(52) U.S. Cl.
  CPC ..... *G06Q 30/0261* (2013.01); *G06Q 30/0271* (2013.01); *G06Q 30/0272* (2013.01)
(58) Field of Classification Search
  None
  See application file for complete search history.

(56) References Cited

U.S. PATENT DOCUMENTS

| 9,239,868 B2 | 1/2016 | Neerincx et al. |
| 9,373,123 B2 | 6/2016 | Carlson et al. |
| 2004/0117257 A1 | 6/2004 | Haberman et al. |

(Continued)

FOREIGN PATENT DOCUMENTS

WO    2002029665 A1    4/2002

OTHER PUBLICATIONS

PCT International Search Report and Written Opinion dated Jan. 13, 2020 in connection with PCT International Patent Application No. PCT/US2019/059161.

*Primary Examiner* — Alvin L Brown
(74) *Attorney, Agent, or Firm* — Amster, Rothstein & Ebenstein LLP

(57) ABSTRACT

Systems and methods for placing personalized content on one or more specified non-personal displays at a public or semi-public location using a personal digital device associated with a first user via a networked placement platform system include computer-implemented processes and associated computer components that receive, from the personal digital device associated with the first user, a request to place personalized content on one or more non-personal displays, filter the personalized content based on at least one of format and content, generate a rendering of the personalized content, and send instructions to a selected one or more non-personal displays for display of the approved personalized content in real-time or in accordance with a predetermined time schedule.

21 Claims, 18 Drawing Sheets

(56) References Cited

U.S. PATENT DOCUMENTS

| | | |
|---|---|---|
| 2005/0044254 A1 | 2/2005 | Smith |
| 2016/0044358 A1* | 2/2016 | Zucchetta ........ H04N 21/26258 725/32 |
| 2016/0098486 A1* | 4/2016 | Wu ..................... G06F 16/9535 707/706 |
| 2016/0125466 A1 | 5/2016 | Kulkarni et al. |
| 2018/0173488 A1 | 6/2018 | Zenoff |
| 2020/0218494 A1* | 7/2020 | Liu ........................ G09G 5/005 |

\* cited by examiner

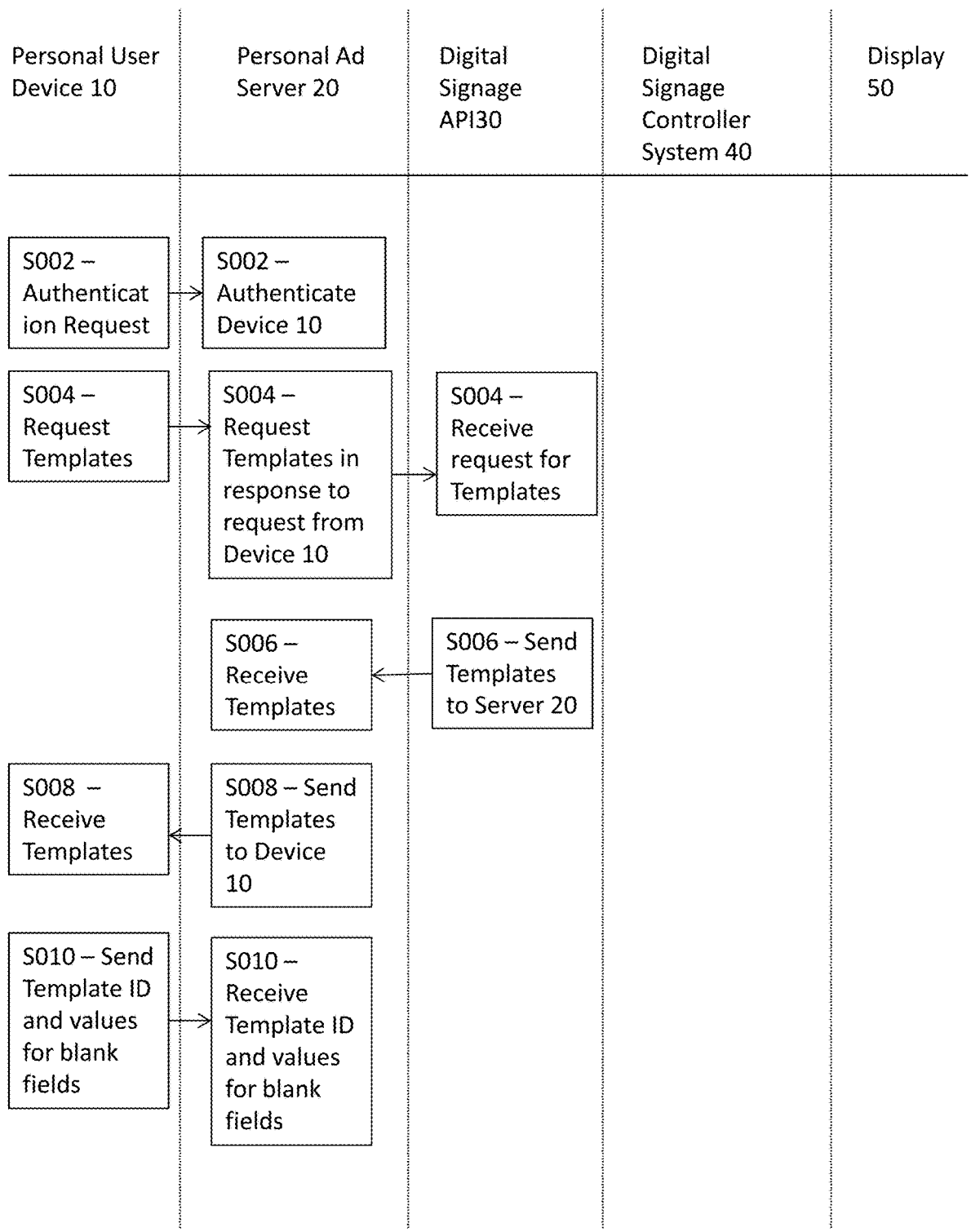
FIG. 8A (continued in FIG. 8B)

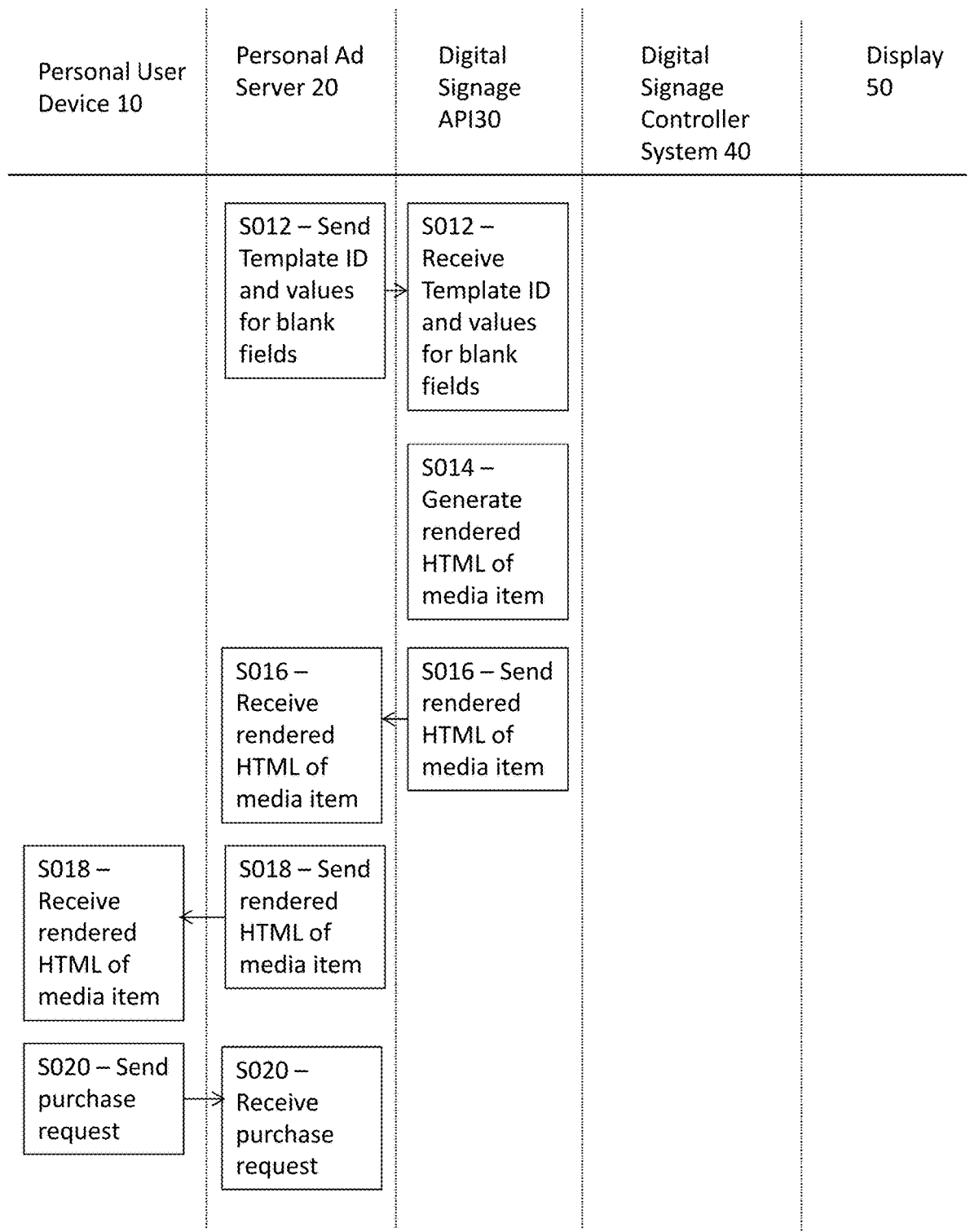
FIG. 8B (continued in FIG. 8C)

ent invention relates generally to systems, methods and program products for distributing personalized content to specific electronic non-personal public or semi-public displays from personal devices.

SYSTEMS, METHODS AND PROGRAM PRODUCTS FOR DISTRIBUTING PERSONALIZED CONTENT TO SPECIFIC ELECTRONIC NON-PERSONAL PUBLIC OR SEMI-PUBLIC DISPLAYS

RELATED APPLICATIONS

This application claims priority to and the benefit of U.S. Provisional Application No. 62/808,445, filed Feb. 21, 2019 and entitled SYSTEMS, METHODS AND PROGRAM PRODUCTS FOR DISTRIBUTING PERSONALIZED CONTENT TO SPECIFIC ELECTRONIC NON-PERSONAL PUBLIC OR SEMI-PUBLIC DISPLAYS, the contents of which are incorporated herein by reference in their entirety.

FIELD

The present invention relates generally to systems, methods and program products for distributing personalized content to specific electronic non-personal public or semi-public displays from personal devices.

BACKGROUND

Over recent years the use of digital displays have become more rampant in public or semi-public locations, such as, for example, urban areas, airports, arenas, businesses, subway stations, building lobbies, elevators, on the exterior of motor vehicles, on seatbacks located in public transportation, retail kiosks, interactive displays, digital street signs, digital bus shelters, digital billboards, and digital map/wayfinding displays, to name a few. A hallmark of such public or semi-public displays is that unlike a personal electronic device, such as a cell phone, the audience for such displays may be a plurality of people which will change over time depending upon who may be present at a given moment.

Typically, content that is displayed on such non-personal public or semi-public displays may be generated either by a stand-alone computer or local area network (such as a window display in a business which advertises the business) or by a vast ad network, such as a real-time-bidding system (RTB).

Current implementations for content placement do not allow for an individual to remotely access, through the individual's personal digital device, a non-personal public or semi-public display and place content, either in real-time or on a pre-scheduled basis, on the display. In particular, technical barriers exist in today's networks to allow for prompt placement and payment for such placement in real time. For example, public and semi-public digital signage run on a variety of operating systems (e.g., Windows, Linux, Android, iOS and proprietary systems), thus posing challenges in the generation of personalized content and scheduling and delivery of such content to the digital signage from a personal user device that may run on a different operating system and network. Technological problems also currently exist in appropriately formatting digital media items generated on a personal user device so that the items can be displayed at non-personal public or semi-public displays in a specified manner. For example, such digital media items generally need to be mapped to different size ratios, resolutions, and orientations to accommodate a variety of display screens, such as, for example, large format screens and digital billboards in train stations, along highways, in arenas, and so on.

Other technological issues currently exist regarding personalized content placement on public or semi-public digital displays. For example, such personalized content might be posted at very large volumes, with perhaps millions of personalized messages broadcasted over thousands of screens. Such large volumes would require moderation and vetting of content to ensure the postings are safe and appropriate for public or semi-public displays, which presents efficiency and overall flow-through issues. Further, programmatic scheduling of this large volume of content is needed to ensure that inventory on a given screen, as it relates to advertising or other content that is required to run on such screen, is available and the personalized content can be posted, either in real-time or on a pre-scheduled basis, in a manner that still seamlessly allows for the delivery of other content and associated revenue streams.

What is needed is a way to address these and other technological barriers.

SUMMARY OF INVENTION

In accordance with exemplary embodiments of the present invention, a method for placing personalized content on one or more specified non-personal displays at a public or semi-public location using a personal digital device associated with a first user via a networked placement platform system comprises: receiving, at the networked placement platform system from the personal digital device associated with the first user, a request to place personalized content on one or more non-personal displays, the request comprising: (i) a template associated with a selected digital media item; (ii) one or more personalized elements of the template; (iii) a selection of at least one of a time or duration to display the selected digital media item; and (iv) a selection of the one or more non-personal displays for display of the selected digital media item; generating, at the networked placement platform system, a rendering of the personalized content based on the template and the one or more personalized elements; analyzing, at the networked placement platform system, the rendered personalized content to determine whether to approve or reject the rendered personalized content; upon the condition that the rendered personalized content is rejected, sending, by the networked platform placement system, a message to the personal digital device notifying the first user of the rejection; upon the condition that the rendered personalized content is approved, generating, at the networked placement platform system, instructions for taking over the selected one or more non-personal displays for display of the approved personalized content in real-time or in accordance with a predetermined time schedule; and sending, by the networked placement platform system, the instructions to the selected one or more non-personal displays for display of the approved personalized content in real-time or in accordance with the predetermined time schedule.

In exemplary embodiments, the request further comprises confirmation of payment by the first user for placement of the personalized content.

In exemplary embodiments, the one or more personalized elements comprise visual elements.

In exemplary embodiments, the visual elements comprise one or more of the following: text, digital stickers, emojis, images, and GIFs, to name a few.

In exemplary embodiments, visual characteristics of the visual elements are customizable.

In exemplary embodiments, the visual characteristics comprise at least one of font type, font size, size of other visual elements, and color scheme.

In exemplary embodiments, the step of analyzing, at the networked placement platform system, the rendered personalized content to determine whether to approve or reject the rendered personalized content comprises: (i) accessing, by the networked placement platform system, a database of acceptable criteria associated with at least one of content and format; and (ii) comparing, by the networked placement platform system, the rendered personalized content to the acceptable criteria.

In exemplary embodiments, the method further comprises the steps of: generating, by the networked placement platform system, location data associated with the one or more non-personal displays; and providing, by the networked placement platform system, to mobile application software at the personal digital device, the location data for selection of the one or more non-personal displays for display of the selected digital media item.

In exemplary embodiments, the step of generating, by the networked placement platform system, location data associated with the one or more non-personal displays comprises: (i) receiving, at the networked placement platform system, user location data associated with the personal digital device and accessed by the mobile application software; and (ii) comparing, by the networked placement platform system, the user location data with location data associated with a plurality of non-personal displays within a network of non-personal displays.

In exemplary embodiments, the user location data comprises at least one of latitude and longitude, Geohash, and positional coordinates associated with the personal digital device.

In exemplary embodiments, the user location data is accessed from a data provider.

In exemplary embodiments, the user location data comprises at least one of real-time network usage data, sensor collected data, application-derived user location data, and purchased third-party location data.

In exemplary embodiments, the step of generating, at the networked placement platform system, a rendering of the personalized content based on the template and the one or more personalized elements comprises generating the rendering based on a markup language document.

In exemplary embodiments, the markup language is HTML, ERB, Jinja2, XSLT, Markdown, Textile or HAML.

In exemplary embodiments, the method further comprises the step of generating for display, at the personal digital device, a graphical user interface, wherein the graphical user interface is configured to: (i) display a plurality of available templates from which the template may be selected; (ii) receive as input to the selected template one or more personalized elements of the template; (iii) receive as input a selection of at least one of a time or duration to display the selected digital media item; and (iv) receive as input a selection of the one or more non-personal displays for display of the selected digital media item.

In exemplary embodiments, the predetermined time schedule comprises an amount of time to delay display of the approved personalized content after receipt of the display instructions.

In exemplary embodiments, the predetermined time schedule comprises an amount of time during which the approved personalized content is to be displayed.

In exemplary embodiments, the method further comprises the step of sending, by the networked placement platform system, to the personal digital device, confirmation that the personalized content has been displayed on the selected one or more non-personal displays.

These and other features and advantages of the present invention will be presented in more detail in the following detailed description and the accompanying figures which illustrate by way of example principles of the invention.

DESCRIPTION OF THE DRAWINGS

The features and advantages of exemplary embodiments of the present invention will be more fully understood with reference to the following, detailed description when taken in conjunction with the accompanying figures, wherein:

FIGS. 8A-8C is a flow chart showing a method of posting a personalized digital media item from a personal user device to a non-personal public or semi-public digital display system according to an exemplary embodiment of the present invention.

DETAILED DESCRIPTION

The present invention relates generally to systems, methods and program products for distributing personalized content to specific electronic non-personal public or semi-public digital displays from personal devices.

For the purposes of the present disclosure, the term "digital display" is intended to encompass all forms of electronic signage (also called electronic signs or electronic displays) that use display technology, such as, for example, LCD, LED, projection, and e-paper, to name a few, to display content, such as, for example, digital images, video, and web pages, to name a few.

For the purposes of the present disclosure, the term "personalized content" is intended to encompass content that is individualized or otherwise customized in accordance with a specific user's requirements and/or parameters as input to a personal digital device, with the intention of being displayed on a digital display.

Various embodiments of the present invention address technological challenges in posting personalized digital media items, such as, for example, personalized electronic messages, personalized electronic greeting cards, personalized announcements and personalized electronic invitations, to name a few, to non-personal public or semi-public digital displays. Such public or semi-public display systems typically run on a variety of operating systems (e.g., Linux, Android, iOS, etc.) and networks. Current platforms are not able to generate and format personalized content intended for display on such public or semi-public systems across the variety of operating systems and networks. Further, without dedicated hardware and/or software, personalized content cannot be delivered to public or semi-public digital displays in real-time or in accordance with scheduling and other criteria that allows a series of personalized content to appear on the screens in a desired sequence and format, in a manner that is seamlessly integrated with other general content scheduled to render on such screens. In embodiments, the various systems and methods of the present invention address these technological challenges by providing a technological and unconventional solution that includes a computer interface environment that is able to adapt personalized digital media items configured through a personal user device for display on public or semi-public digital display systems. This technological problem is met through an innovative arrangement of computer components between the personal user device and the non-personal digital display, including mobile application software operating on the personal user device, a personal ad server, a digital signage API, and a digital signage control system.

Figure 1:
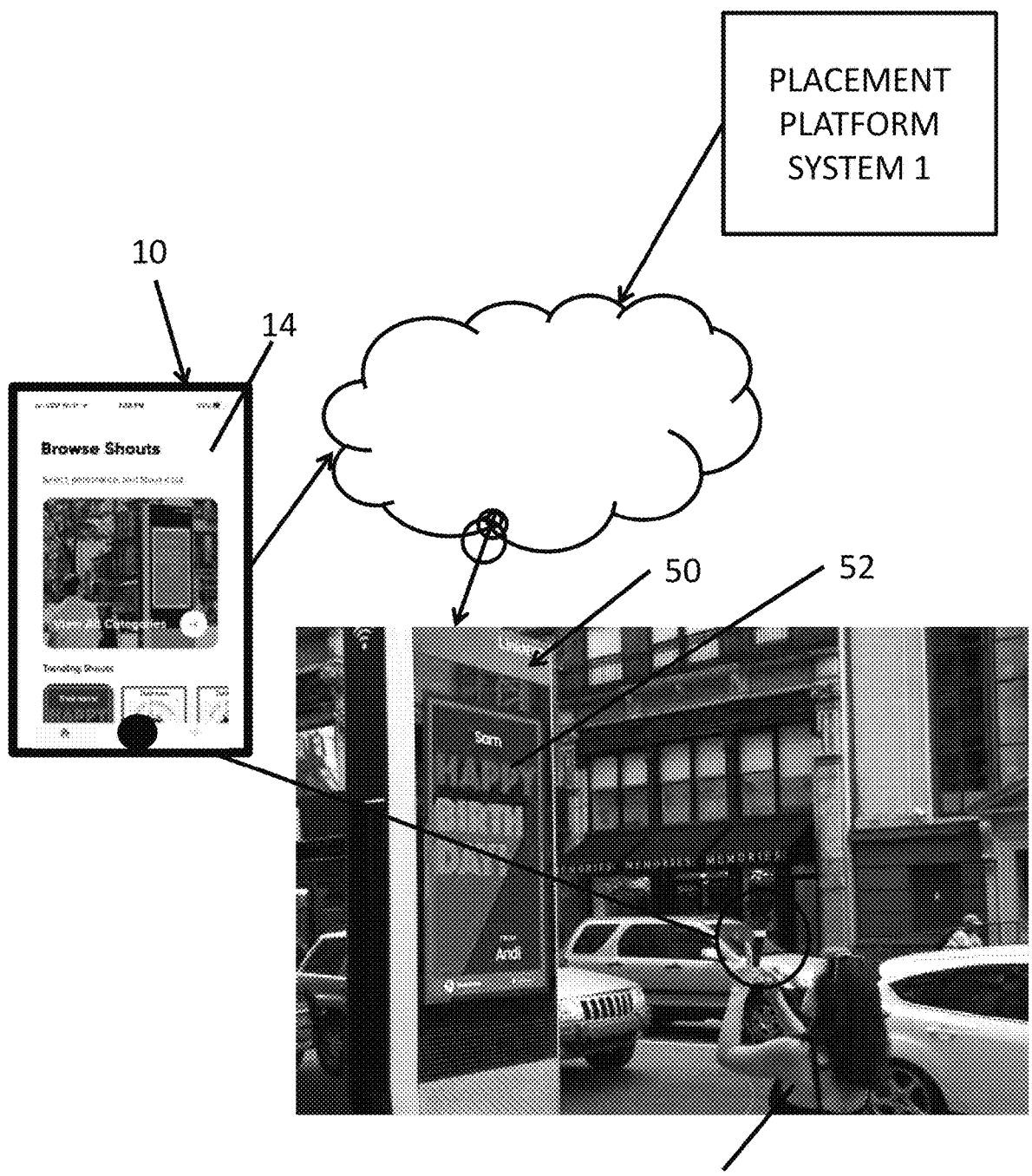
FIG. 1 illustrates an exemplary environment in accordance with exemplary embodiments of the present invention in which a personalized digital media item from a personal user device is displayed on a non-personal public or semi-public digital display system.
Figure 2:
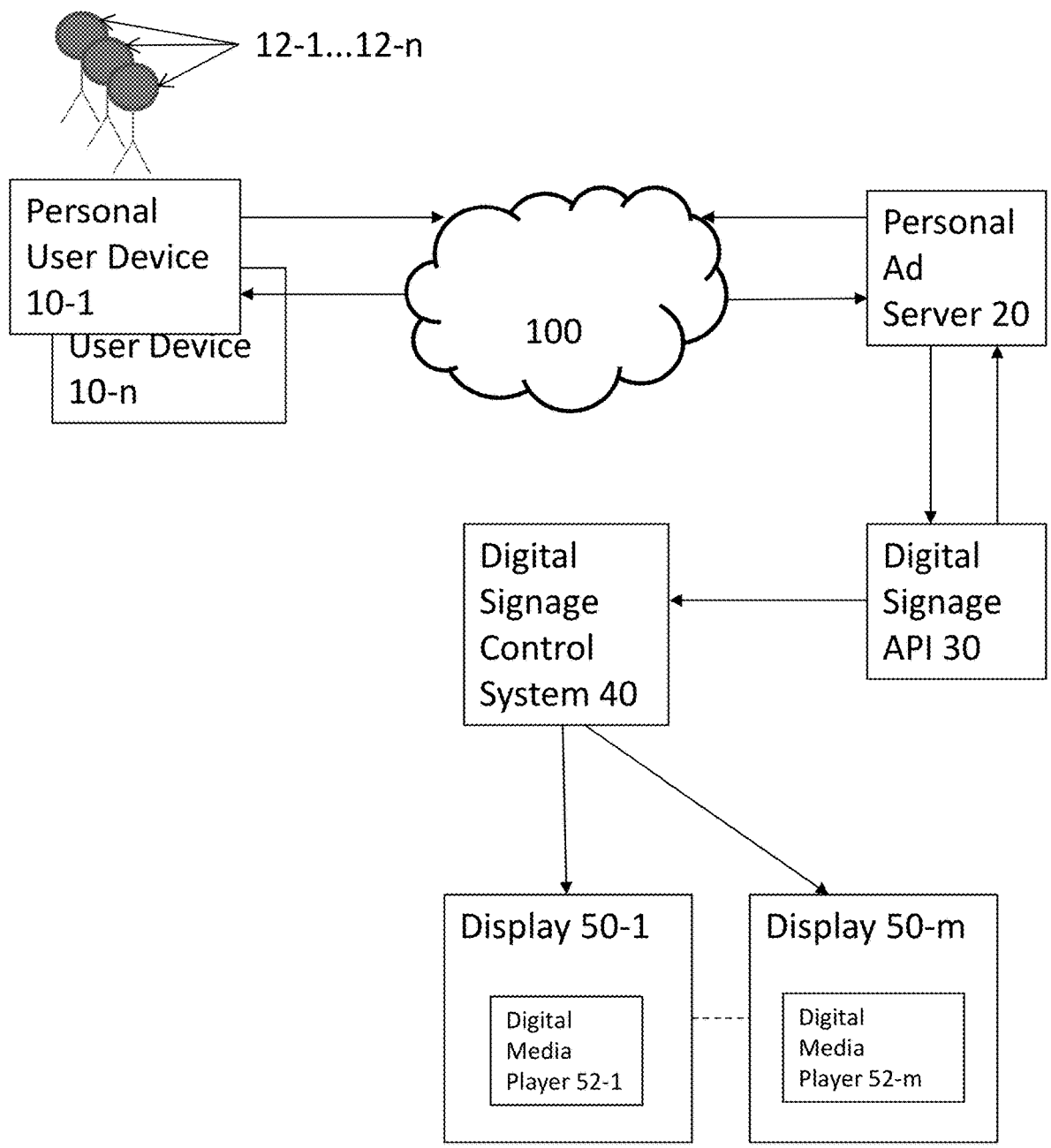
FIG. 2 illustrates a more detailed exemplary environment in accordance with exemplary embodiments of the present invention in which a personalized digital media item from a personal user device is displayed on a non-personal public or semi-public digital display system.

FIG. 1 is a broad overview of a system for displaying a personalized digital media item on a public or semi-public digital display according to an exemplary embodiment of the present invention, while FIG. 2 shows more detailed aspects of the system according to an exemplary embodiment of the present invention. It will be appreciated that each of the devices, systems and platforms illustrated in FIGS. 1 and 2 are represented as a single unit, but may be comprised of one or more units consistent with embodiments of the present invention. Further, it should be appreciated that these components may be modules of one or more other components, or may be embodied in a single component having all of the functionality of these components.

As shown in FIGS. 1 and 2, one or more personal user devices 10-1 . . . 10-n, associated with one or more individual users 12-1 . . . 12-n, are provided. In embodiments, personal user devices 10-1 . . . 10-n may include personal computers with Internet access that is uniquely identifiable by an Internet Protocol (IP) address or by Internet cookies stored on the personal computers. Personal user devices 10-1 . . . 10-n may be smartphones that are uniquely identifiable by, for example, a Mobile Advertising Identifier. Other personal user devices 10-1 . . . 10-n may include, for example, television set-top boxes, tablet computers, portable media devices, appliances, websites, and gaming consoles. It should be noted that in some embodiments a personal user device may comprise more than one device. For example, a personal user device may be a set of smartphones associated with a user.

In embodiments, the personal user devices 10-1 . . . 10-n may have downloaded into memory mobile application software 14. The personal user devices 10-1 . . . 10-n may be operatively connected via a network 100 to a personal ad server 20. The network 100 may be the Internet, an intranet network, a local area network, or other wireless or other hardwired connection or connections by which individual components of the system may communicate.

Personal ad server 20 may be, include, or be part of a technology and/or service that provides advertisements to, for example, network-connectable devices. In various embodiments, personal ad server 20 may include, for example, a general purpose computer, a server, a mainframe computer, a computer with a specific purpose of serving advertisements, or a combination of one or more thereof. For example, ad server 20 may be a computer server that stores commercial advertisements and/or personalizable digital media item templates (either modified by an individual or in default form) to be served to network-connectable devices, such as a digital signage API for ultimate display on a non-personal public or semi-public digital display system. Although not necessary in the various exemplary embodiments of the present invention, personal ad server 20 may also perform data gathering and data analysis tasks such as, for example, counting advertising impressions or clicks.

As shown in FIG. 1, in practice, a personalized digital media item is displayed on a display screen 52 of a digital display system 50 based on the input of an individual user 12 to the mobile application software 14 operating on the user's personal electronic device 10. The mobile application software 14 is in communication over a network to a placement platform system 1. The placement platform system 1 may include components such as, for example, the personal ad server 20, a digital signage API 30, and a digital signage control system 40. As explained in more detail below, the personal ad server 20 is operatively connected to the digital signage API 30 that renders a personalized digital media item based on the user input (e.g., selection and personalization of a template) to the mobile application software 14, which in turn is operatively connected to the digital signage control system 40 that sends the rendered personalized digital media item to the digital display system 50 positioned at a public or semi-public location. The personalized digital media item may be displayed in real-time or in accordance with scheduling criteria. For the purposes of the present invention, the term "real-time" is intended to mean that the personalized digital media item is displayed within a specified time period that is very soon after the individual user sends the posting request, for example, within a matter of seconds (e.g., 5 seconds, 30 seconds, etc.) or minutes (e.g., one minute, 3 minutes, etc.)

Although FIG. 1 illustrates the digital display system 50 as an outdoor display known as LinkNYC®, other non-personal public or semi-public network-connected electronic devices and displays can also be used in accordance with exemplary embodiments of the present invention. For example, network-connected screens placed in subway stations, building lobbies, airports, elevators, on the exterior of motor vehicles, on seatbacks located in public transportation, retail kiosks, interactive displays, digital street signs, digital bus shelters, digital billboards, digital signage in arenas or other venues, digital map/wayfinding displays, to name a few, are applicable to the present invention.

In the example shown, a user 10 has selected for display on the display system 50 a "happy birthday" message. In embodiments, personalized content may be generated using one or more customizable templated designs. For example, a customizable templated design may include a desired message (e.g., Happy Birthday, Happy New Years, Will You Marry Me, to name a few), and personalized information for customization (e.g., "from" name and "to" name, date, event information, to name a few). A customizable templated design may also include artwork, such as a birthday cake rendering for a happy birthday message. A customizable templated design may also include audio. A customizable templated design may also include visual elements such as text, digital stickers, emojis, images, GIFs, to name a few, and the ability to tailor visual elements such as font types, font sizes, the size of other visual elements, color schemes, etc.

Figure 3:
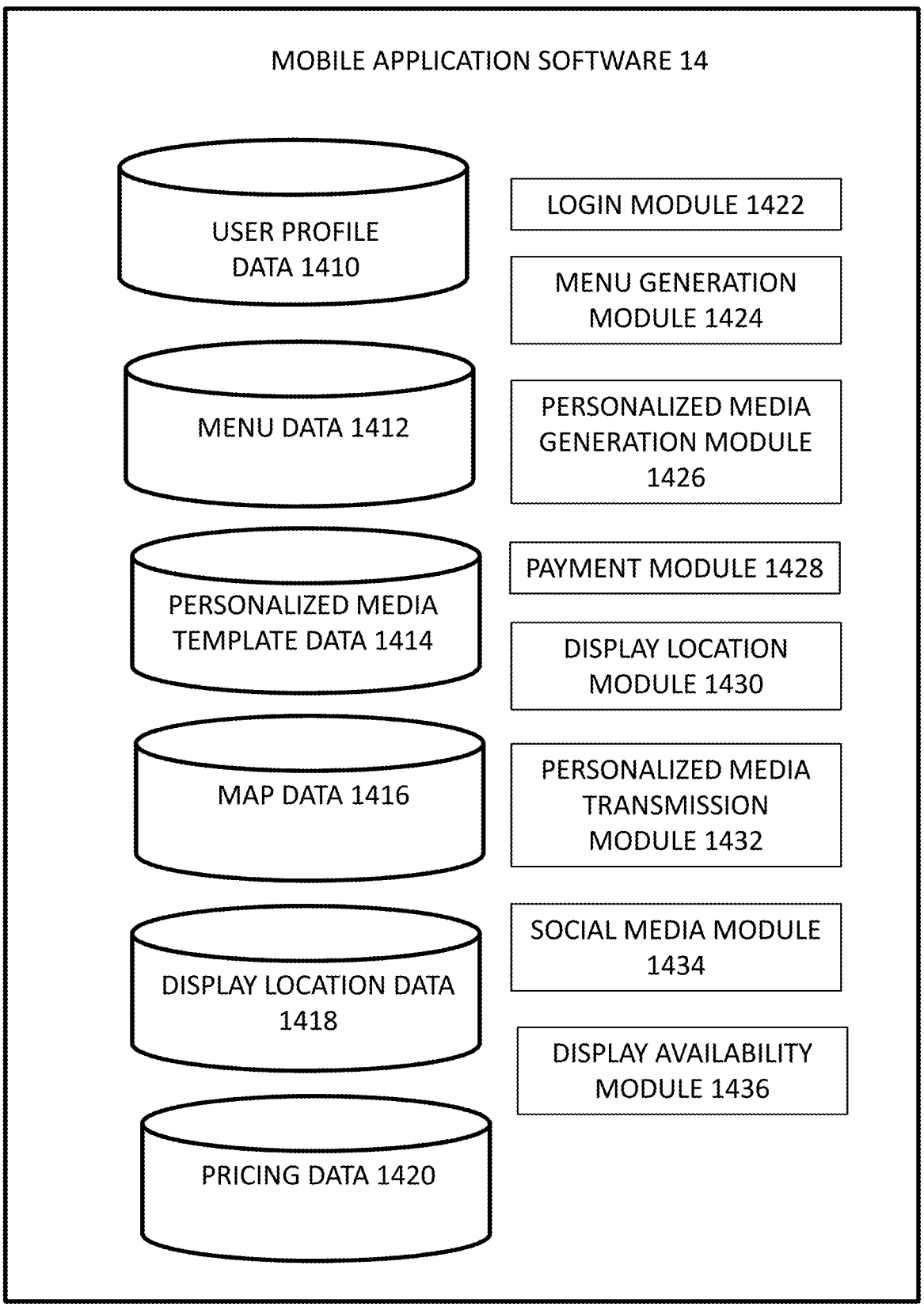
FIG. 3 is a block diagram of mobile application software according to an exemplary embodiment of the present invention.

As shown in FIG. 3, the mobile application software 14 may be stored on memory (not shown) of the one or more personal user devices 10-1 . . . 10-$n$ and run on one or more processors (not shown) of the one or more personal user devices 10-1 . . . 10-$n$. The mobile application software 14 may be configured to store information such as, for example, user profile data 1410, menu data 1412, personalized media template data 1414, map data 1416, non-personal display location data 1418, and pricing data 1420, to name a few. The mobile application software 14 may include one or more software modules, such as, for example, login module 1422, menu generation module 1424, personalized media generation module 1426, payment module 1428, non-personal display location module 1430, personalized media transmission module 1432, social media module 1434, and display availability module 1436, to name a few. The processes performed by such modules, the data produced thereby and/or the data accessed thereby are described herein.

Figure 4:
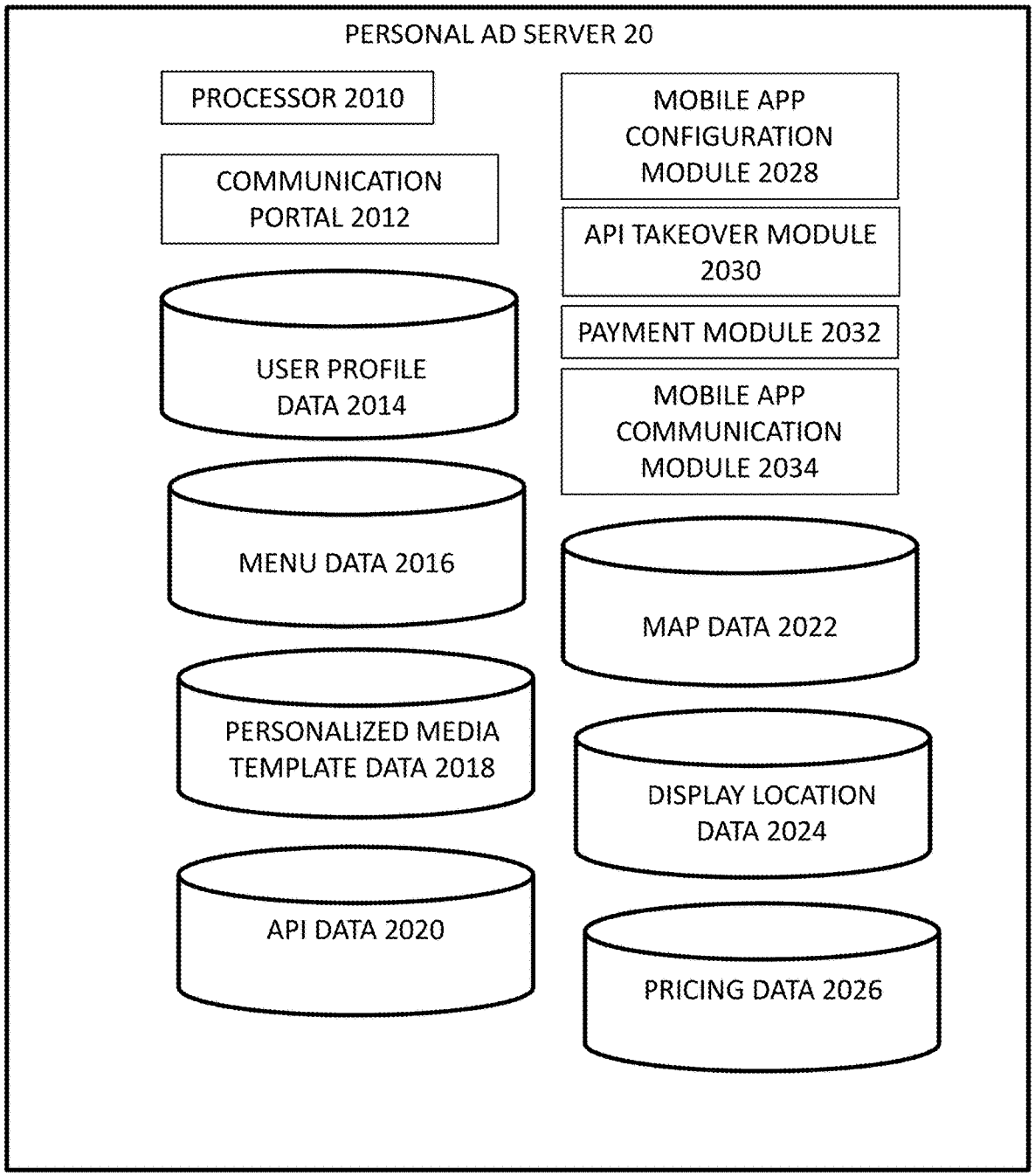
FIG. 4 is a block diagram of a personal ad server according to an exemplary embodiment of the present invention.

As shown in FIG. 4, the personal ad server 20 may include one or more processors 2010 and a communication portal 2012 (e.g., for sending and/or receiving data). The one or more processors 2010 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The personal ad server 20 can also include non-transitory computer-readable memory with one or more databases and data stored thereon. The memory may comprise electronic memories such as random access memory (RAM), read-only memory (ROM), or other types of memory, in any combination. Data stored on the memory can include user profile data 2014, menu data 2016, personalized media template data 2018, API data 2020, map data 2022, display location data 2024 and pricing data 2026, to name a few. One or more software modules may be stored in the memory and running or configured to run on the one or more processors 2010. Such modules can include a mobile application configuration module 2028, API takeover module 2030, a payment module 2032, and a mobile application communication module 2034, to name a few. The processes performed by such modules, the data produced thereby and/or the data accessed thereby are described herein.

Figure 5:
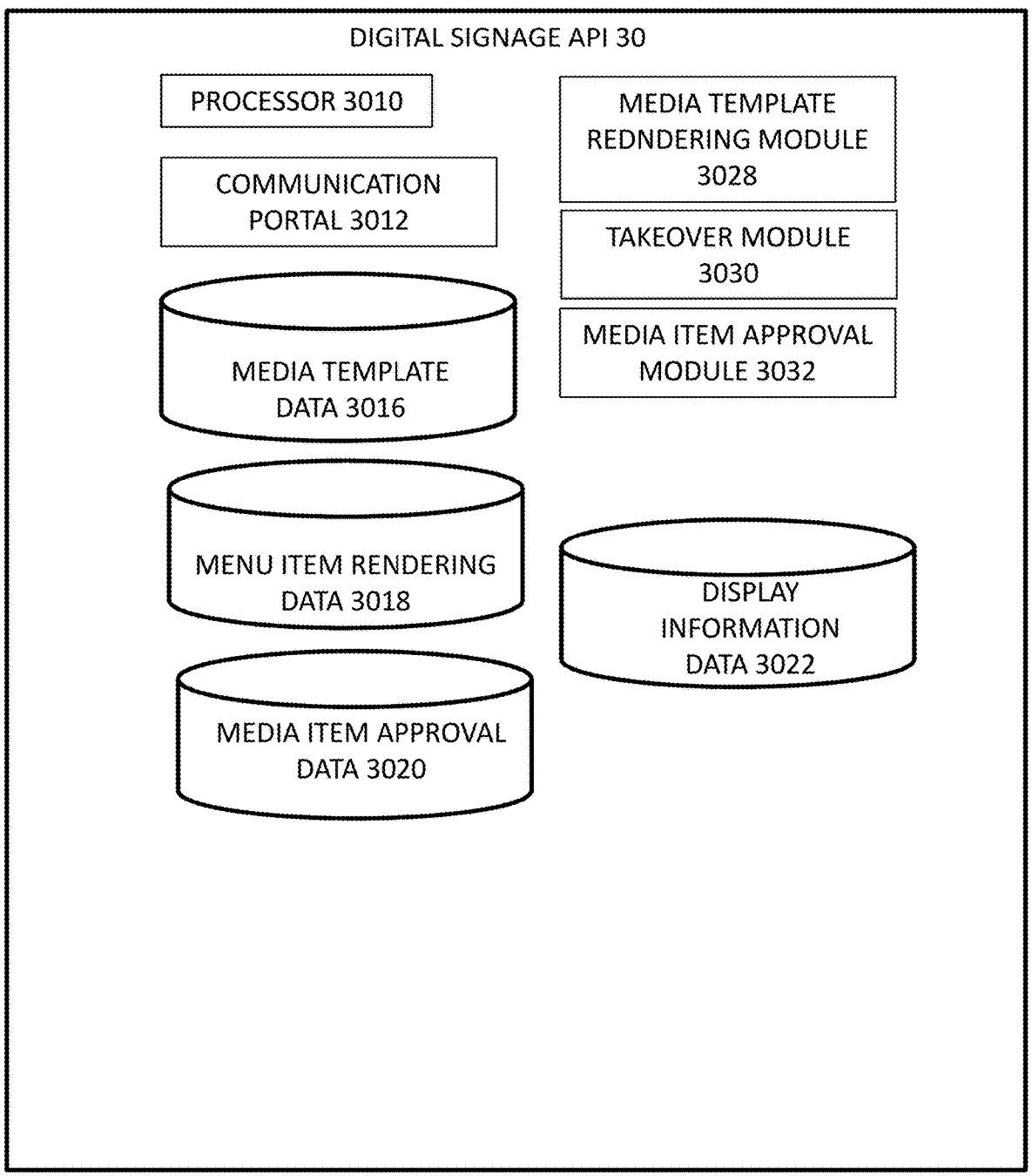
FIG. 5 is a block diagram of a digital signage application programming interface according to an exemplary embodiment of the present invention.

As shown in FIG. 5, the digital signage API 30 may include one or more processors 3010 and a communication portal 3012 (e.g., for sending and/or receiving data). The one or more processors 3010 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The digital signage API 30 can also include non-transitory computer-readable memory with one or more databases and data stored thereon. The memory may comprise electronic memories such as random access memory (RAM), read-only memory (ROM), or other types of memory, in any combination. Data stored on the memory can include media template data 3016, media item rendering data 3018, media item approval data 3020, and display information data 3022, to name a few. One or more software modules may be stored in the memory and running or configured to run on the one or more processors 3010. Such modules can include a media template rendering module 3028, a takeover module 3030, and a media item approval module 3032, to name a few. The processes performed by such modules, the data produced thereby and/or the data accessed thereby are described herein.

In embodiments, the digital signage API 30 is configured as a control layer to the digital signage control system 40. For example, the digital signage API 30 may set up content that is allowed to run on the display 50. The following pseudocode represents an algorithm performed by the digital signage API 30 according to an exemplary embodiment of the invention:

---

Network/Application Setup

---

The Takeover API allows multiple client applications to be approved to post content to screens, potentially with restrictions enforcing business rules like content approval, prioritization levels, etc.

```
setup( ) {
   register_screen_in_takeover_api(screen_id)
   register_template_in_takeover_api(template_id, template_content, category)
   approve_template(template_id) // allows enforcing content policies
   register_client(shoutable_app_credentials)
}
```

---

User Requesting a "Shout"

---

```
//validate user input? (e.g. name validation)
== 1. IN SHOUTABLE BACKEND:
if stripe_charge_token is valid {
   charge_credit_card
   takeover_api.post(
      "/screens/[screen-id1]/takeovers",
      {
         screen_id: [screen-id1],
         template_id: [template-id],
         duration: 60, // in seconds
         template_content: [values for blanks in template (to/from)],
      }
      "/screens/[screen-id2]/takeovers",
      {
```

-continued

```
      screen_id: [screen-id2],
      template_id: [template-id],
      duration: 60, // in seconds
      template_content: [values for blanks in template (to/from)],
    }
  )
  return success
}
== 2. IN TAKEOVER API
if screen_id is valid
   && template_id is valid
   && request.user.hasPermission {
   if screen_id allows takeover( )
      && current_content_is_preemptible( ) {
         record_takeover_attempt(screen_id, template_id, template_slugs[ ])
         template.replace(template_slugs[ ])
         trigger.takeover(screen_id, trigger_category_id, template)
   } else {
      reject( )
   }
}
== 3. ON PLAYER
on_takeover_event( ) {
   add_takeover_container_to_playlist( )
   takeovers[ ] = get_takeovers_for_screen_from_api(screen_id) {
      for(takeover in takeovers[ ]) {
         render(takeover.content)
         record_log_event(screen_id, takeover_id, takeover_content)
      }
   }
}
```

Figure 6:
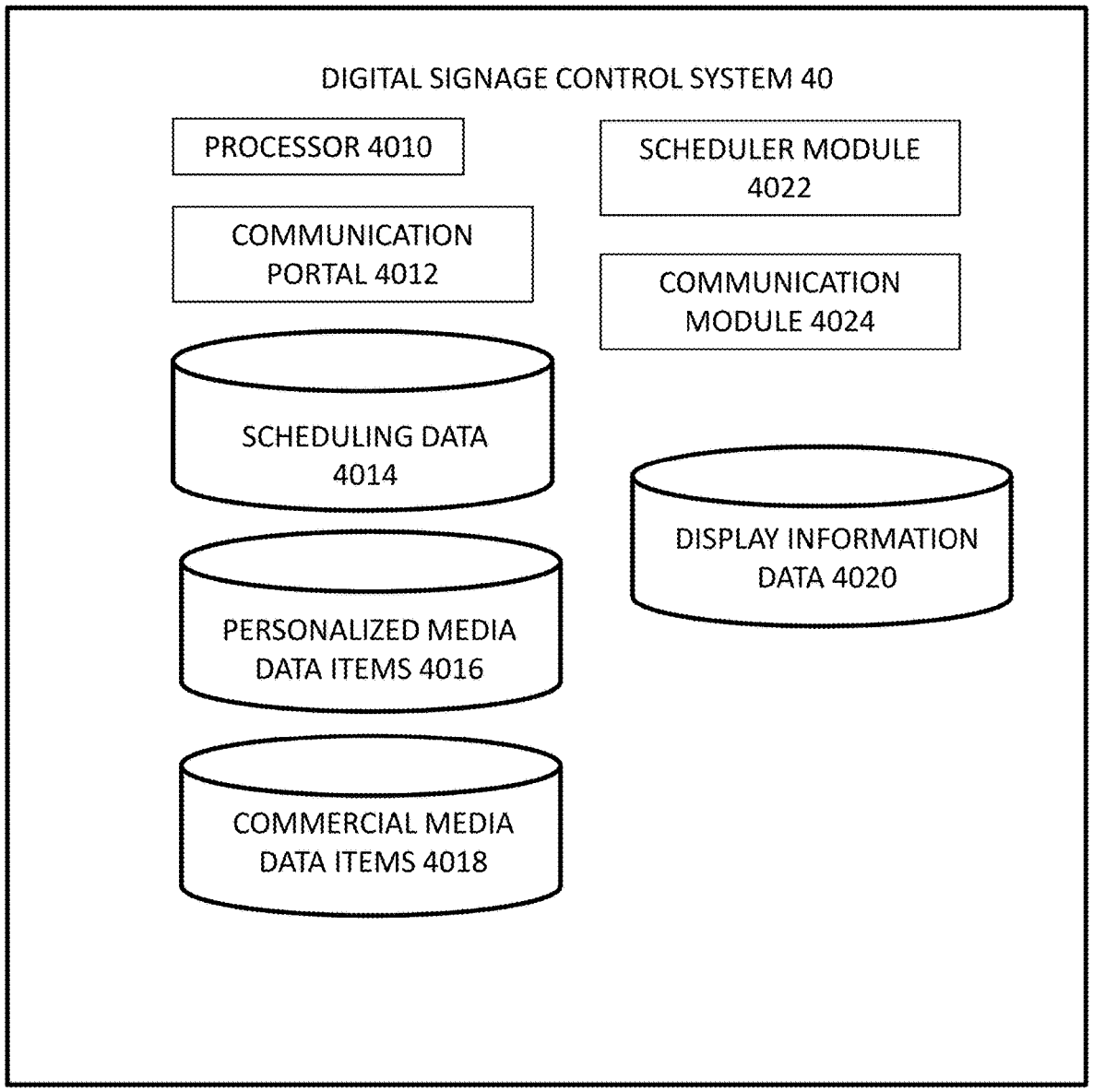
FIG. 6 is a block diagram of a digital signage control system according to an exemplary embodiment of the present invention.

As shown in FIG. 6, the digital signage control system 40 may include one or more processors 4010 and a communication portal 4012 (e.g., for sending and/or receiving data). The one or more processors 4010 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The digital signage control system 40 can also include non-transitory computer-readable memory with one or more databases and data stored thereon. The memory may comprise electronic memories such as random access memory (RAM), read-only memory (ROM), or other types of memory, in any combination. Data stored on the memory data can include scheduling data 4014, personalized media data items 4016, commercial media data items 4018 and display information data 4020, to name a few. Other data may include, for example, non-commercial media data items (e.g., "house content"), scheduling information data, content restriction data, metadata associated with location, and screen categorization data. One or more software modules may be stored in the memory and running or configured to run on the one or more processors 4010. Such modules can include a scheduler module 4022 and a communication module 4024, to name a few. The processes performed by such modules, the data produced thereby and/or the data accessed thereby are described herein. In exemplary embodiments, the digital signage control system may be any known or later discovered system providing automated digital signage control software and/or hardware, such as, for example, Broadsign (Broadsign International, LLC, Montreal, Quebec, Canada), Vistar (Vistar Media, New York, N.Y., USA) and Alto™ (Ayuda Media Systems, Montreal, Quebec, Canada).

Figure 7:
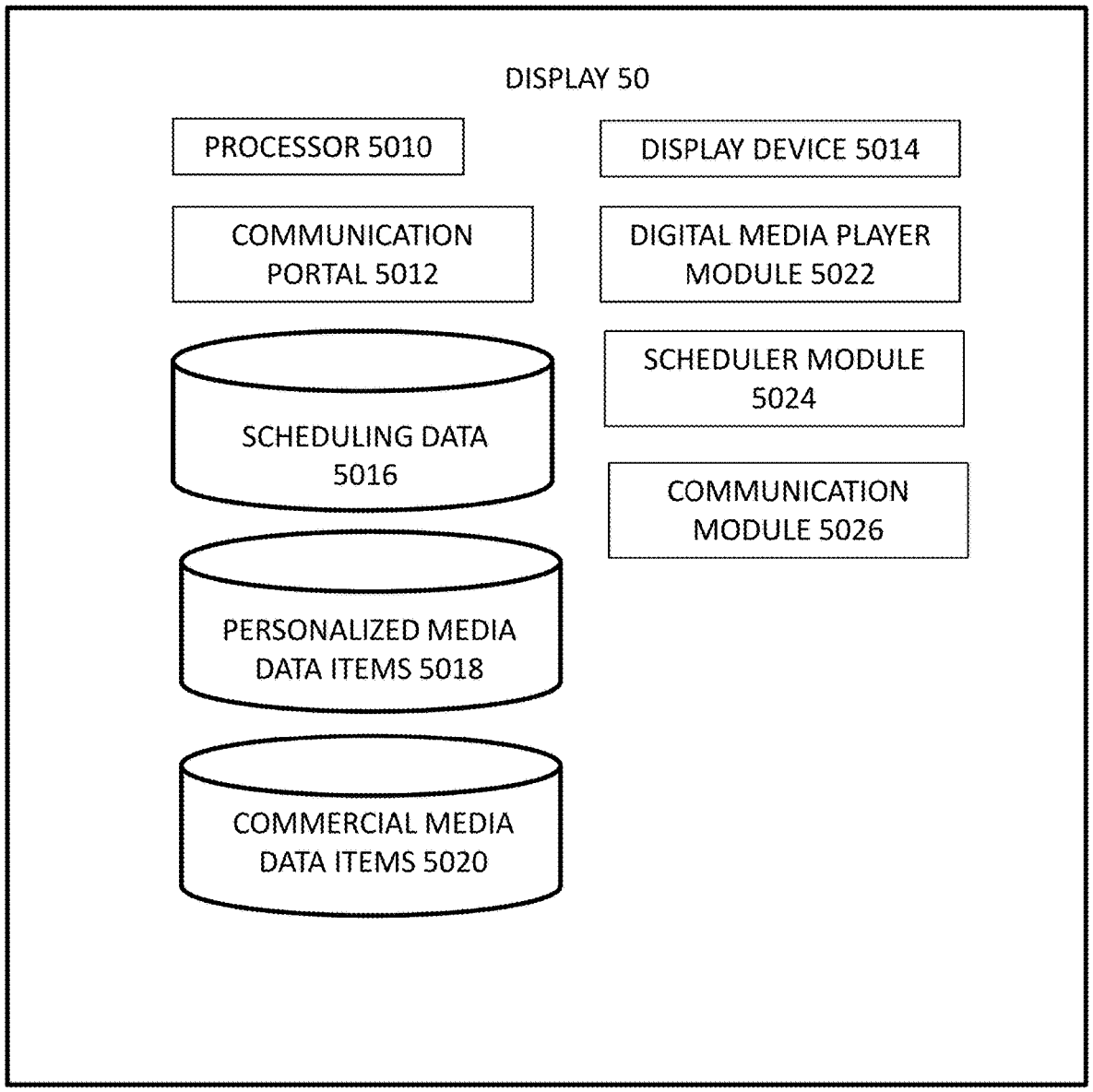
FIG. 7 is a block diagram of a non-personal public or semi-public digital display system according to an exemplary embodiment of the present invention.

As shown in FIG. 7, the digital display system 50 may include one or more processors 5010, a communication portal 5012 (e.g., for sending and/or receiving data) and a display device 5014. The one or more processors 5010 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The display device may incorporate display technology such as, for example, LCD, LED, projection, and e-paper, to name a few. The digital display system 50 can also include non-transitory computer-readable memory with one or more databases and data stored thereon. The memory may comprise electronic memories such as random access memory (RAM), read-only memory (ROM), or other types of memory, in any combination. Data stored on the memory can include scheduling data 5016, personalized media data items 5018, and commercial media data items 5020, to name a few. Other data items may include, for example, non-commercial media data items (e.g. "house content"), scheduling information data, content restriction data, metadata associated with location, and screen categorization data. One or more software modules may be stored in the memory and running or configured to run on the one or more processors 5010. Such modules can include a digital media player module 5022, a scheduler module 5024 and a communication module 5026, to name a few. The processes performed by such modules, the data produced thereby and/or the data accessed thereby are described herein.

The digital display system 50 may also include a network connection, such as a network switch and fiber connection. Other types of network connections such as cellular modem using GPRS, EDGE, 3G, 4G LTE, low power LTE, Ethernet, token-ring, Wi-Fi, WiMAX, Bluetooth, ZigBee, fixed-point wireless, mesh networks, or other data transmission technologies, to name a few, may also be used in accordance with exemplary embodiments of the present invention. In embodiments, such as LinkNYC®, the digital display system 50 may offer other features such as an interactive screen, Wi-Fi or other wireless connections, electric power, location "beacons" or information tagging, phone calling, emergency service access, display of non-advertising information, video recording, audio recording, and environmental condition recording, to name a few.

By way of illustration, a first user 12 may open the first application module 14 on the first personal user device 10 and enter either automatically or manually first user credentials for the first user 12. User credentials may be verified locally on the first user device, and/or sent to the personal ad server 15 to be remotely verified.

Figure 9A:
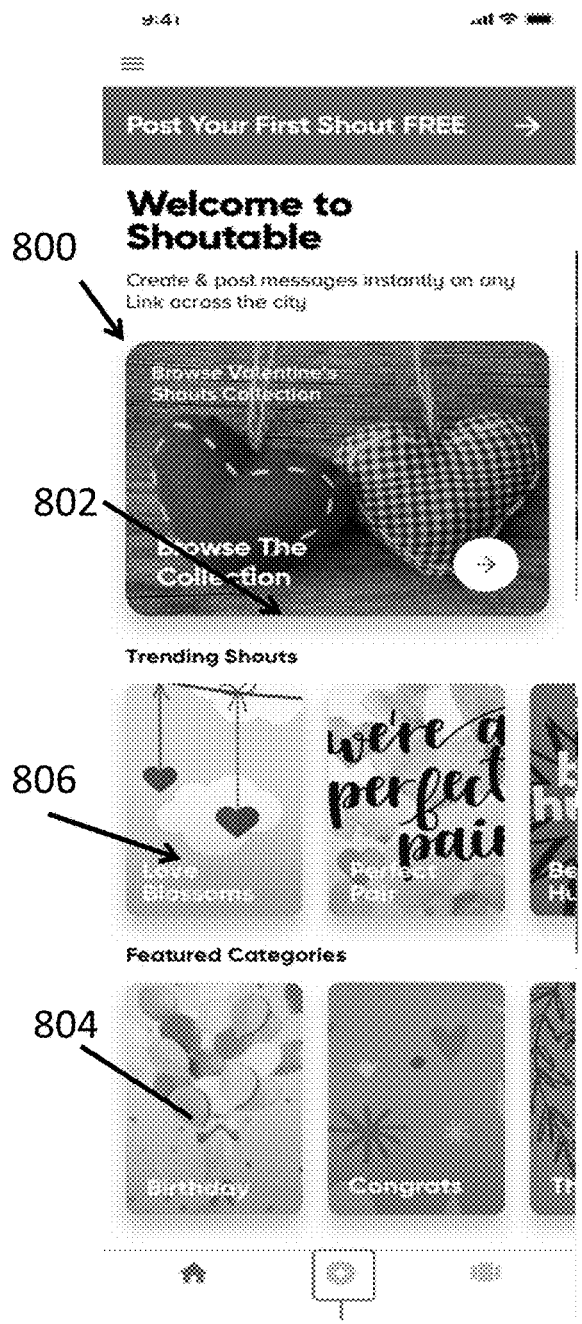
FIGS. 9A-9P show various screen shots of a graphical user interface of mobile application software for posting a personalized digital media item from a personal user device to a non-personal public or semi-public digital display system according to an exemplary embodiment of the present invention.
Figure 9B:
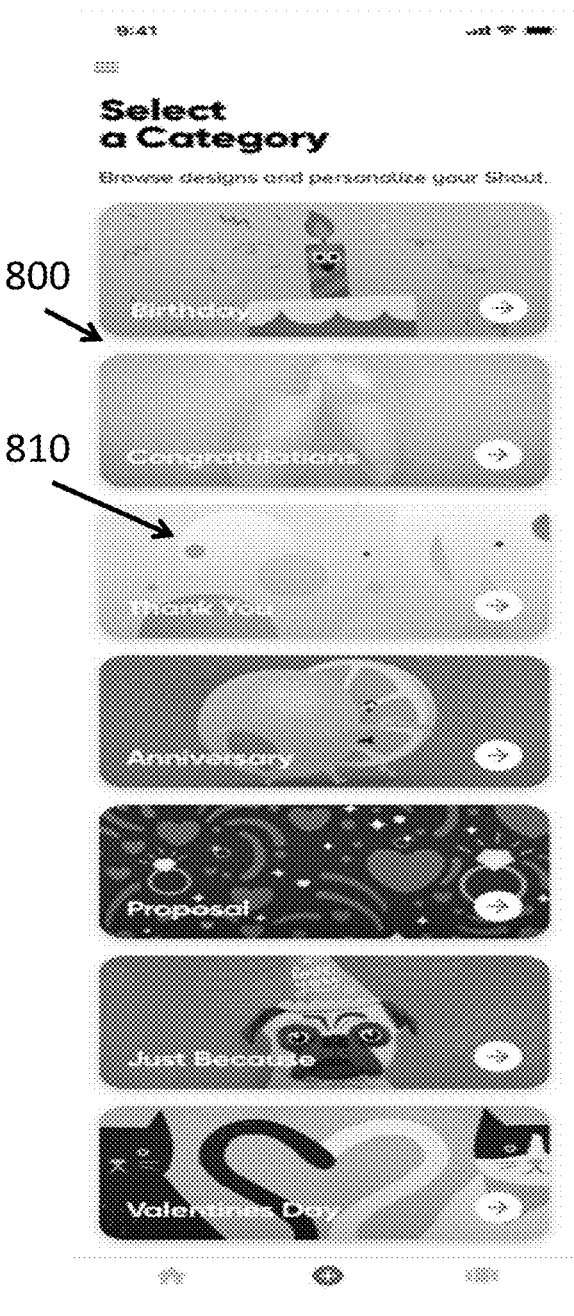
Figures 9C, 9D:
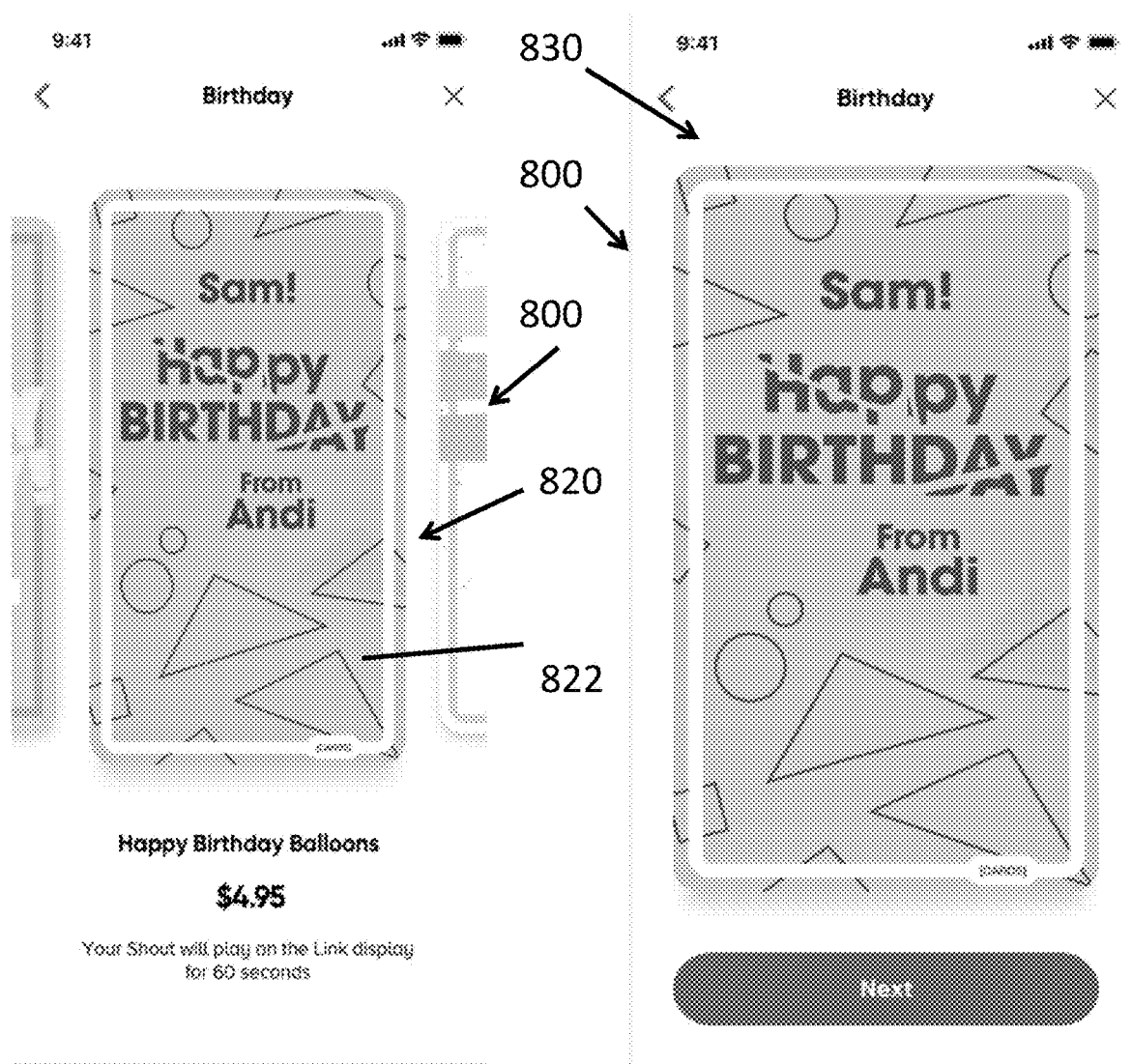
Figure 9E:
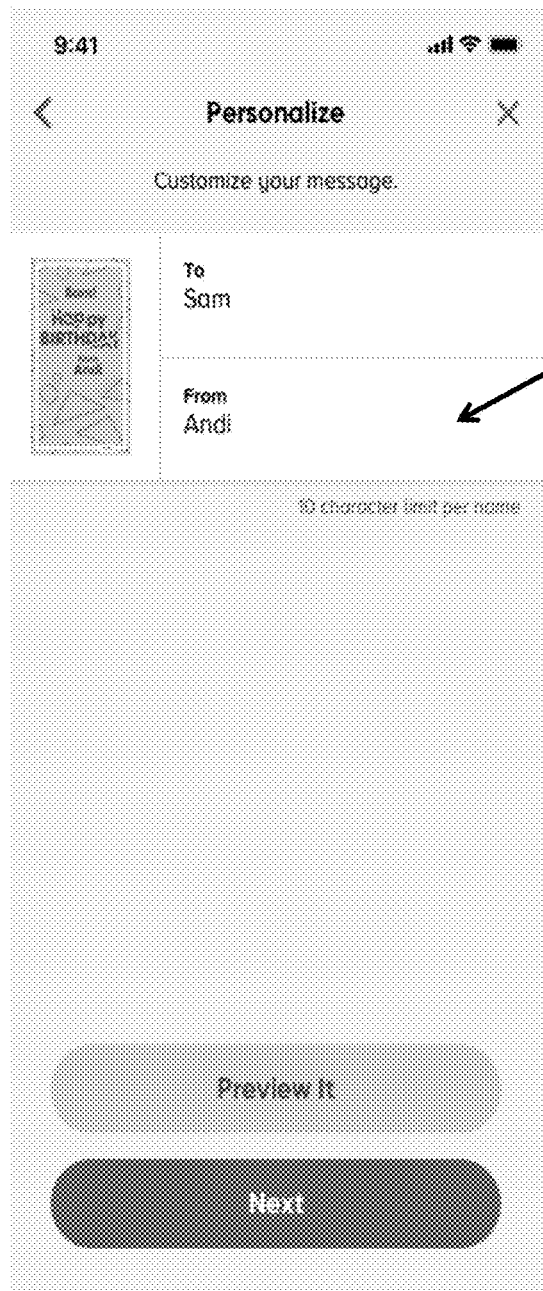
Figure 9F:
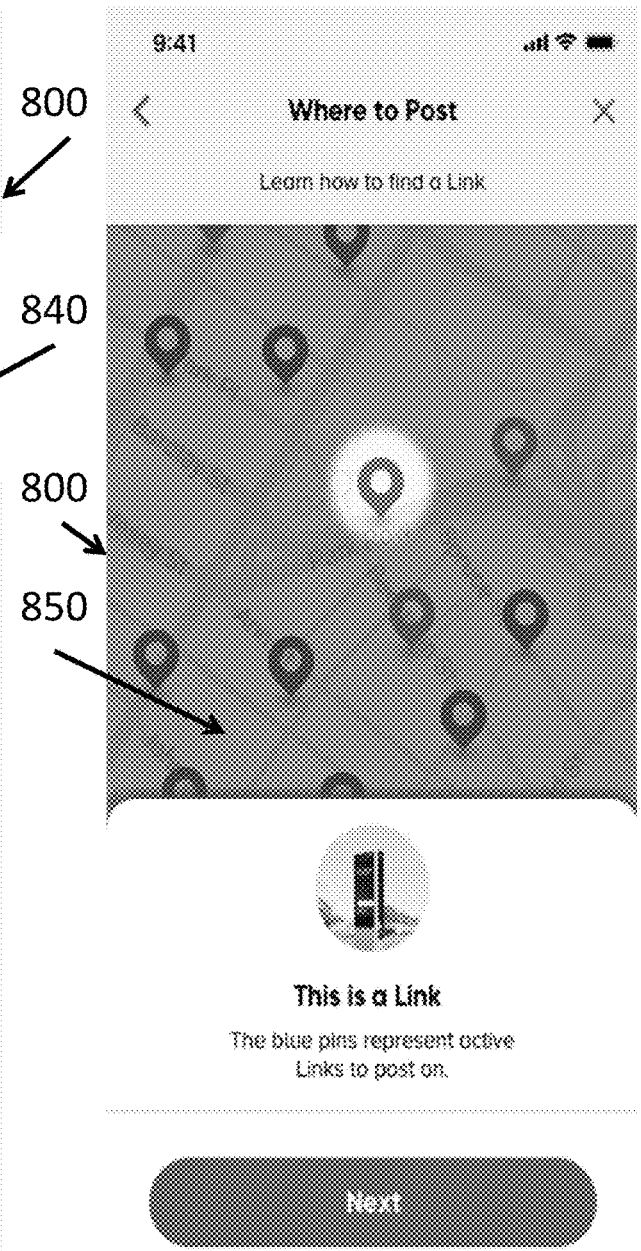
Figure 9G:
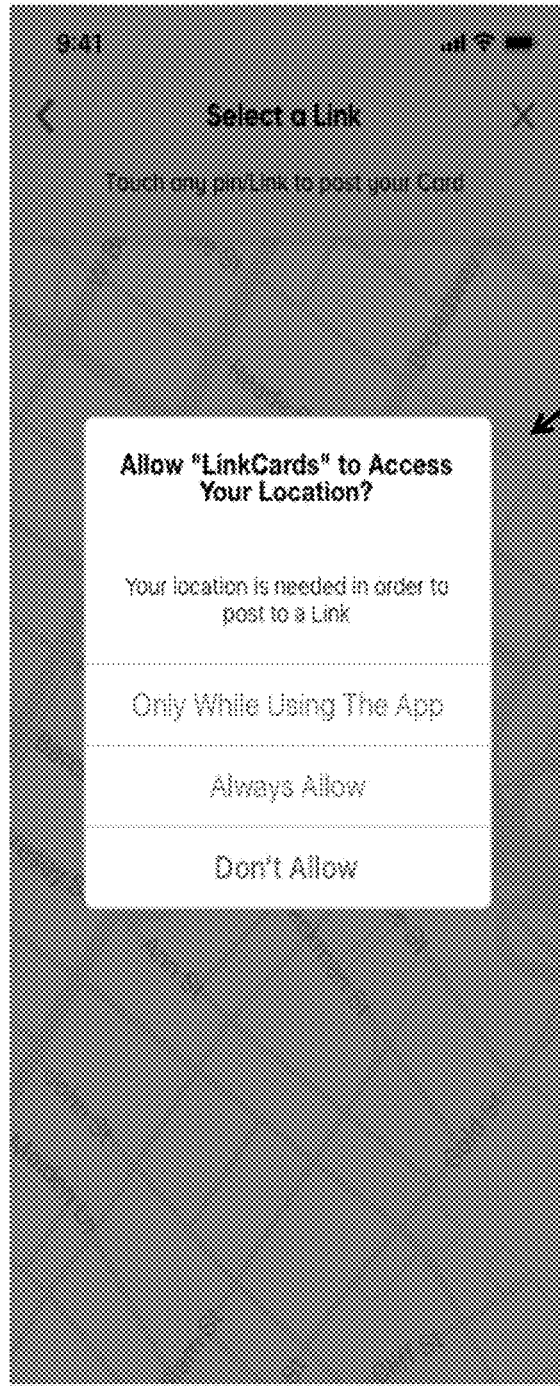
Figure 9H:
Figure 9I:
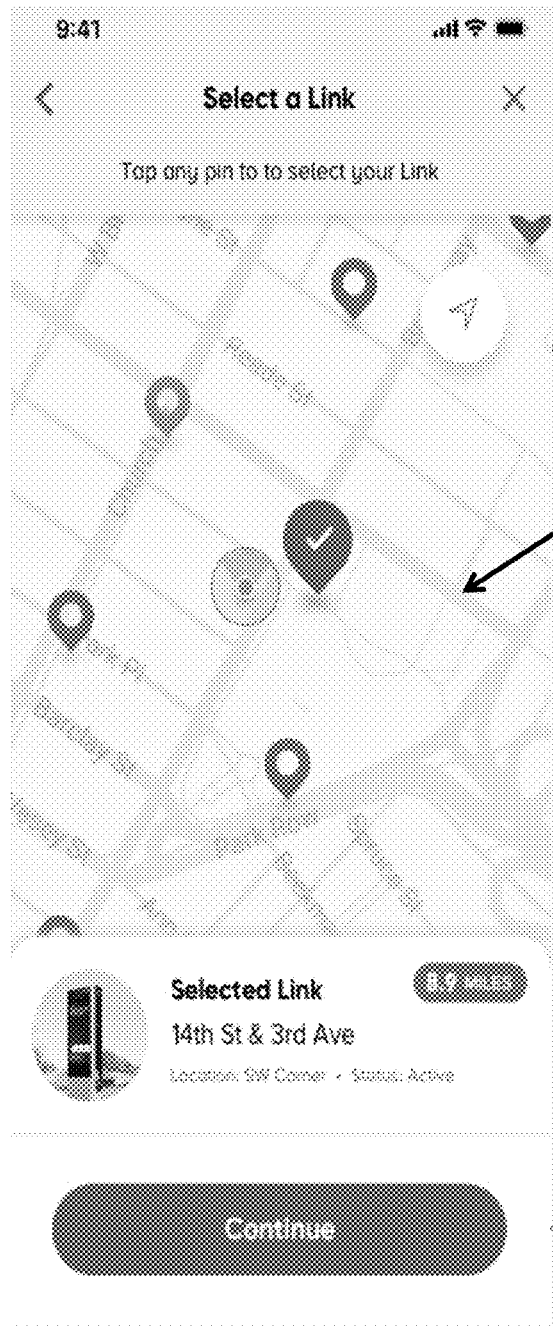
Figure 9J:
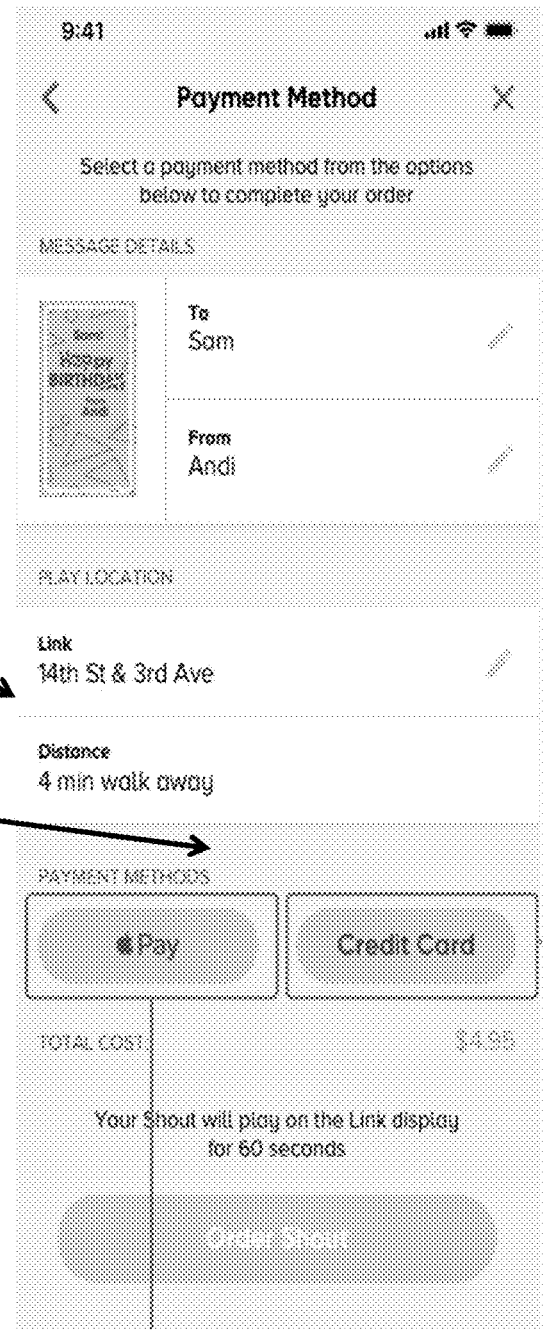
Figure 9K:
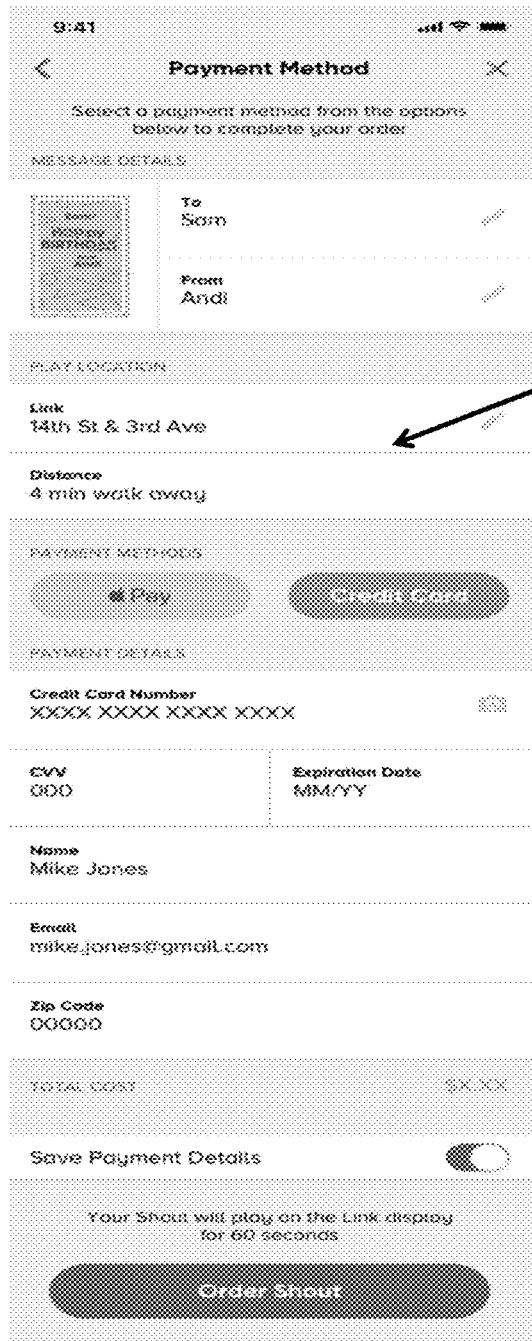
Figure 9L:
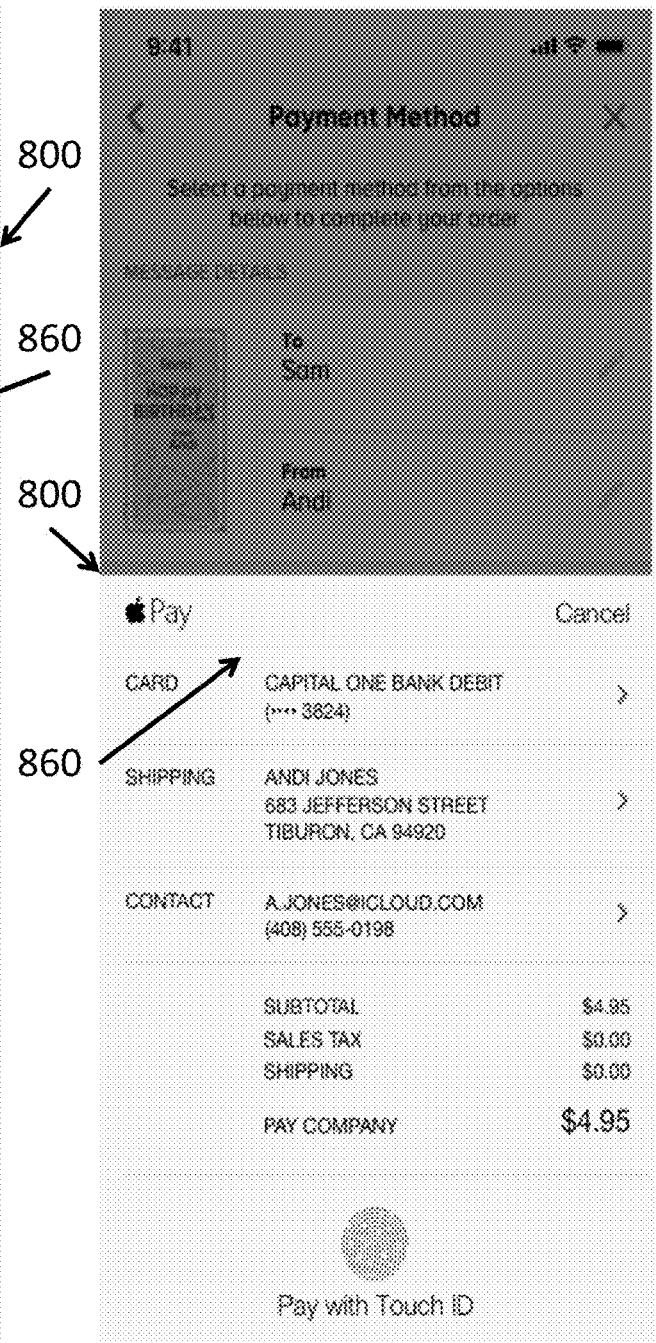
Figures 9M, 9N:
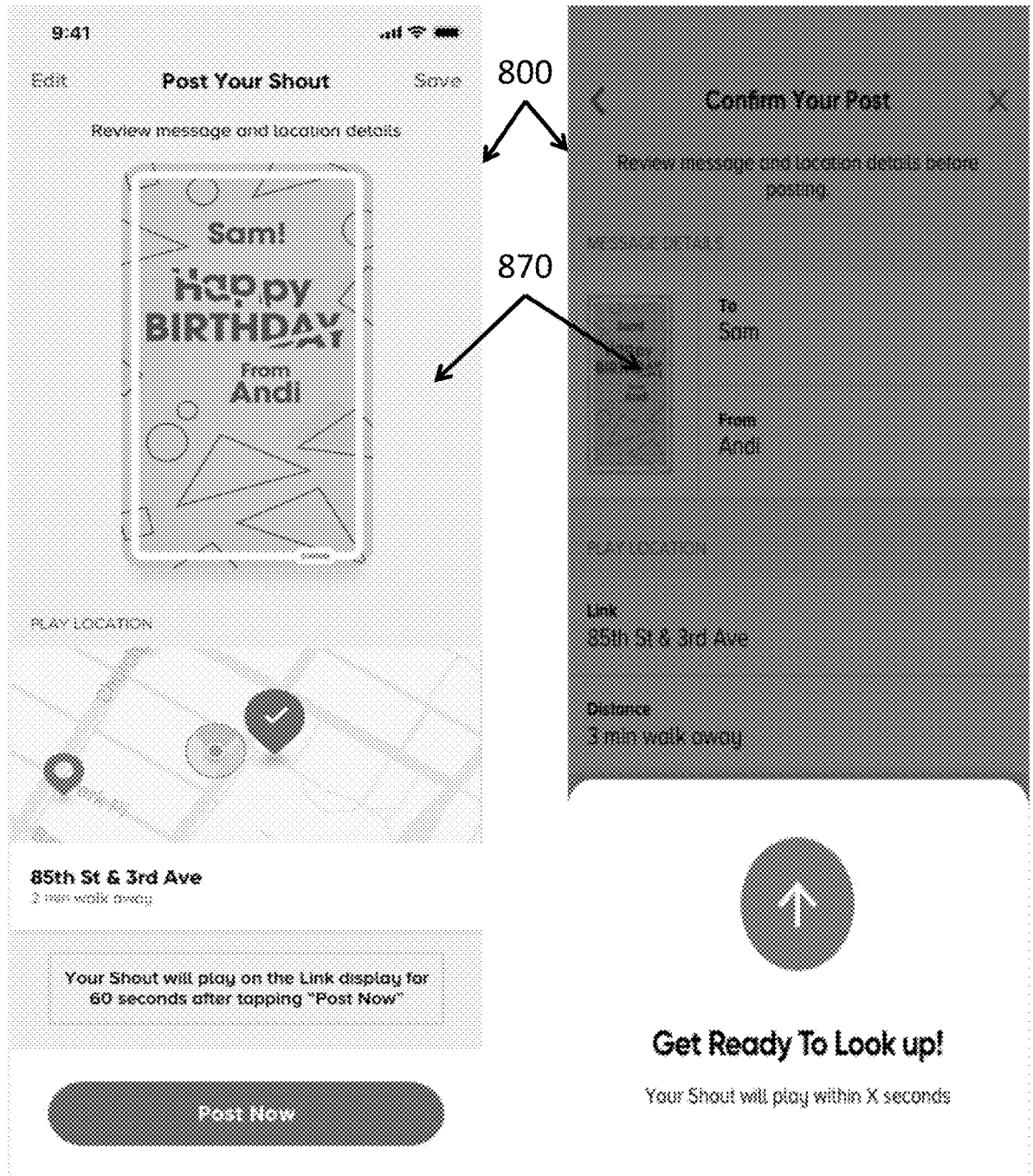
Figure 9O:
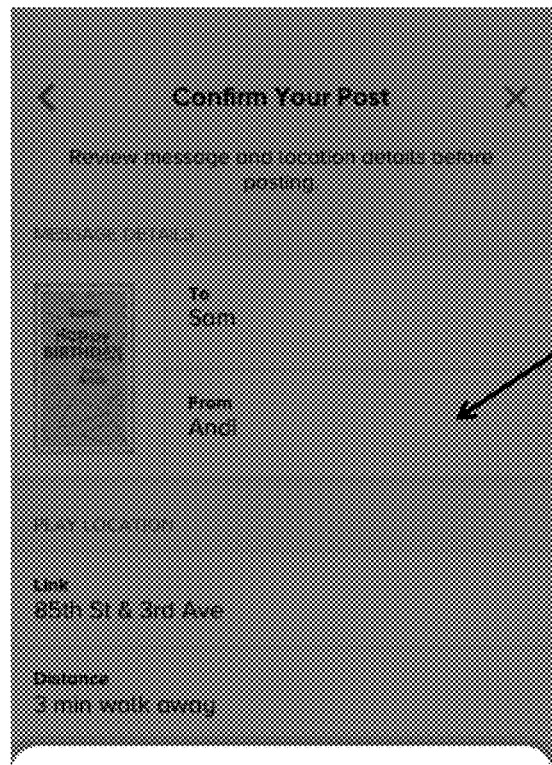
Figure 9P:

FIGS. 9A-9P shows various screen shots of a graphical user interface, generally designated by reference number 800, generated by the mobile application software 14 according to an exemplary embodiment of the present invention. In embodiments, the graphical user interface 800 may include one or more windows, controls (e.g., widgets), icons, tabs and menu items configured to allow an individual user (first user 12, in this example) to select, modify, submit payment and otherwise generate a personalized digital media item for display on the digital display system 50. For ease of explanation, the overall process performed by the first user 12 will be alternatively referred to as the "posting process" and the personalized digital media item will be alternatively referred to as a "post" in the following description.

Prior to gaining access to the features of the mobile application software 14, first user 12 may be requested to enter login information, such as, for example, a user ID and password, to verify the user's identity. In embodiments, verification of the login information may allow the first user 12 to gain access to personal profile data, such as, for example, preferred templates, preferred template categories, previously used templates, previously viewed categories, previously used values for template blank fields, previously used visual elements, a list of contacts with corresponding contact information (e.g., names, phone numbers, e-mail addresses, etc.), and alerts related to, for example, upcoming events for which the first user 12 may want to post a personalized digital media item on the digital display system 50, to name a few.

FIG. 9A shows a screen shot of an introductory window 802 of the graphical user interface 800 according to an exemplary embodiment of the present invention. The introductory window 802 may be configured to allow the first user 12 to browse through a selection of preferred collections and/or categories of personalizable templates. For example, the introductory window 802 may include a plurality of preferred category icons 804 and/or preferred post icons 806 each associated with a particular preferred category and/or preferred post, respectively. Preferred categories may include, for example, trending categories, featured categories, categories related to certain events (e.g., birthdays, anniversaries, etc.), previously-selected categories, and categories that may be particularly relevant to the current time and location (e.g., holidays, local events, etc.). Preferred posts may include trending posts, featured posts, posts related to certain events (e.g., birthdays, anniversaries, etc.) previously-generated posts, and posts that may be particularly relevant to the current time and location (e.g. holidays, local events, etc.). The first user 12 may select one of the preferred category or post icons or another button provided in the window 802 to proceed with the posting process.

As shown in FIG. 9B, upon selection of one of the preferred category icons 804, the first user 12 may be presented with a category browse window 810. The category browse window 810 may be configured to allow the first user 12 to scroll or otherwise browse through available post categories and select one of the post categories of interest. Such categories may include, for example, "birthday", "congratulations", "thank you", "anniversary", "marriage proposal", "just because", "Valentine's Day", to name a few.

As shown in FIG. 9C, upon selection of one of the categories from the category browse window 810, or upon selection of one of the preferred posts as a post of interest, the first user 12 may be presented with a post template browse window 820. The post template browse window 820 may be configured to display a plurality of selectable templates 822, including that of the selected post of interest, within the selected category showing the first user 12 how the posts might appear at the digital display system 50 before the posts are personalized. The post template browse window 820 may also display other information, such as, for example, the cost of each post and the amount of time each post will be displayed at the digital display system 50. The first user 12 may browse through the selected category (or the category associated with the selected post of interest) to view other posts of potential interest.

As shown in FIG. 9D, upon selection of one of the posts from the post browse window 820, the selected post template is displayed in a post template display window 830. The first user 12 can then view the selected post template and decide whether to proceed with the posting process or navigate back to the post template browse window 820 for selection of another post template. If the selected post template is deemed acceptable, the first user 12 may continue the posting process by selecting a "next" button or other navigation widget within the post template display window 830.

As shown in FIG. 9E, upon user acceptance of the selected post template in the post template display window 830, the graphical user interface 800 may display a template personalization window 840. The template personalization window 840 may be configured to allow the user to customize the selected post template by, for example, filling in template fields, downloading and adding digital photos, images and/or other visual elements for inclusion in the post template, and modifying graphical and textual elements of the post template (e.g., selecting color, font, size, etc.), to name a few. In the case where images are downloaded, a determination may be made as to whether the images are acceptable using, for example, AI image scanning. In embodiments, the user may have the capability to customize the template with emojis, stickers, GIF images, or the like. In embodiments, the template personalization window 840 may be configured to allow the user to preview the customized post template by selecting an appropriate widget (e.g., a "preview" button), in which case the customized post template may be displayed in a separate window or within the template personalization window 840 itself.

As shown in FIGS. 9F-9I, after completion of the post template customization, the first user 12 may navigate to a post location window 850. The post location window 850 may graphically display one or more available public or semi-public digital display systems 50 within a predetermined proximity (e.g., within a specified radius) to the first user 12. In this regard, the mobile application software 14 on the personal electronic device 10 associated with the first user 12 may collect location data, such as, for example, latitude/longitude, Geohash, or other positional coordinates, to name a few, associated with the personal electronic device 10 and compare the location data with known locations of the digital display systems 50. The mobile application software 14 may be connected through a network (such as the Internet) to a data provider that provides some or all of the location data in the form of, for example, real-time network usage data, sensor collected sightings, application-derived user location data, or purchased third-party location data, to name a few. In embodiments, as shown in FIG. 9G, the mobile application software 14 may request the user's permission to access the user's location.

In embodiments, the mobile application software 14 may be configured to alert a user under certain circumstances, such as, for example, when the user is within range of a screen, when new templates become available, and when a draft posting still needs completion, to name a few. Notification may be based on, for example, geofence technology to determine if the user device is within range of an digital display system 50 within the network.

In embodiments, the graphic display of the available digital display systems 50 may include icons representing the available systems transposed over a map. As shown in FIG. 9H, the user's location may be displayed on the map along with the icons associated with the digital display systems 50. A listing of the nearest digital display systems 50 and associated addresses may also be provided within the post location window 850. In embodiments, the post location window 850 may indicate the systems 50 closest to the user by, for exampling, highlighting the icons associated with the closest one or more of the systems 50 or by listing the closest systems 50 first within the system listings. It should be appreciated that the graphic display of available systems 50 is not limited to that shown, and in other embodiments, for example, the post location window 850 may present a list of available systems 50 and associated locations in menu form or may allow the user to input an address to locate a system 50 nearby the address.

As shown in FIG. 9I, the first user 12 may choose one of the digital display systems 50 by, for example, selecting a corresponding one of the icons within the map or by selecting one of the listed system locations. The icon associated with the selected system 50 may then be highlighted by, for example, altering the color of the icon or by displaying a check mark over the icon. In embodiments, the post location window 850 may be configured to allow the user to select more than one of the digital display systems 50, which may be appropriate in situations where, for example, the user would like to make the same posting on more than one screen or make multiple postings each at a different one of the systems 50. It should be appreciated that in exemplary embodiments the system 1 may be configured to allow a user to make one posting on one screen, one post on many screens or many posts on many screens.

As shown in FIG. 9J, upon selection of the location of the system 50, the first user may navigate to a payment processing window 860. It should be appreciated that payment may be initiated at any other time during the posting process. The payment processing window 860 may be configured to allow the first user 12 to select a payment method, such as, for example, credit card, electronic check, or online payment systems (e.g., Paypal, Trustly, Smartpay, PaymentWall, Apple Pay, Google Wallet, Braintree, Stripe, to name a few). In embodiments, the payment processing window 860 may display information related to the personalized post that is being purchased, such as, for example, a graphic of the personalized post, editable fields associated with the personalized post, and the selected post play location (e.g., address and walking distance), to name a few. FIG. 9K shows the payment processing window 860 after the user has selected to pay by credit card, with fields made available for input of credit card information (e.g., credit card number, expiration date, etc.). FIG. 9L shows the payment processing window 860 after the user has selected to pay using an online payment service, with editable fields for default payment source (e.g., credit card, bank account) and user contact information (e.g., address, e-mail, etc.).

As shown in FIG. 9M, after the first user 12 makes payment, the graphical user interface 800 may display a post activation window 870. The post activation window 870 may be configured to allow the user to preview the post and location details before initiating the post. The first user 12 may activate the post by, for example, selecting a "post now" button or some other appropriate widget within the post activation window 870. In embodiments, the mobile application software 14 may be configured to display a posting at the selected one or more digital display systems 50 either in real-time or with a predetermined or user-selectable time delay after the user initiates the posting. For example, the post may be displayed 60 seconds, one hour or some other time period after post activation. Further, in the case where the user is making multiple postings (either all the same posting or a number of different postings), the system 1 may be configured to delay each posting for the same or different amounts of time in accordance with set or user-selectable scheduling parameters.

In embodiments, the mobile application software 14 may be configured to allow users to schedule their posts for a specified time and/or date. For example, a calendar and clock may be displayed with the ability for the user to select a date and time range. Users may also have the option to trigger the post with a set delay, when the user device is in front of the display (using, for example, device location, geofences and/or Bluetooth) or at a scheduled time. Users may also have the option to specify how long the post will be displayed on one or more screens of the digital display systems 50, for example for one minute, two minutes, five minutes, etc.

As shown in FIGS. 9N-9O, after activation of the post, the post activation window 870 may display a countdown to the posting time so that the user is made aware of the exact moment of posting. It should be appreciated that the user may be notified of the posting in other ways, such as, for example, by activating a ring tone on the personal electronic device 10 and/or by activating a vibrating or some other alert on the personal electronic device 10.

As shown in FIG. 9P, the graphical user interface 800 may then present a confirmation window 880 showing an image of the post on the selected digital display system 50 or on a generic digital display. In embodiments, the confirmation window 880 may be configured to allow the user to begin another posting process by browsing categories/templates and to allow the user to report a problem to technical support. The user may also be presented with an option to upload an image of the posting to a social network, such as, for example, Facebook, Twitter, and LinkedIn, to name a few.

Figure 8C:
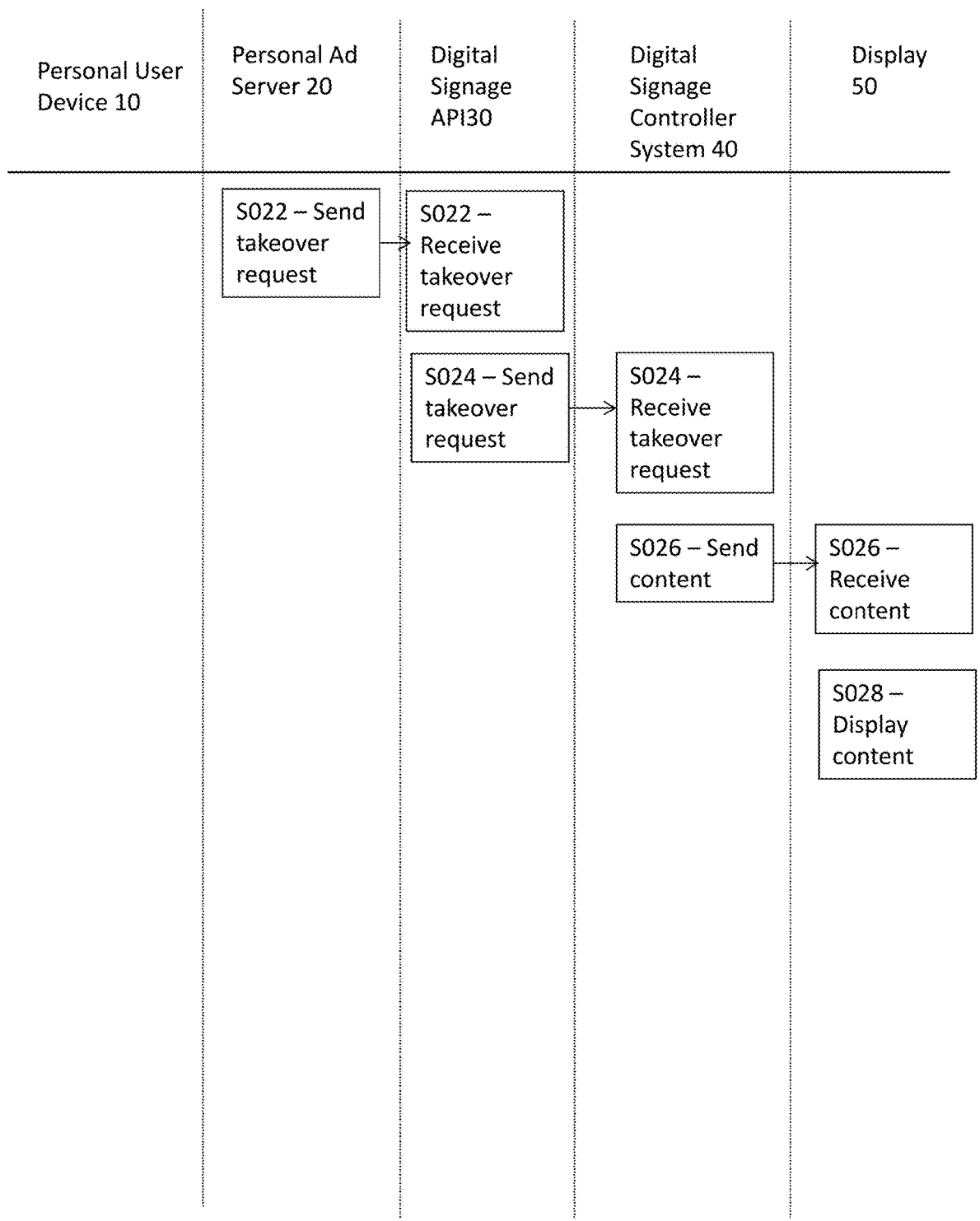

FIG. 8A-8C is a flow diagram of a process for posting a personalized digital media item to a non-personal public or semi-public digital display according to an exemplary embodiment of the present invention. In embodiments, the first user 12 may use the mobile application software 14 installed on the personal user device 10 to generate personalized content to be displayed on the digital display system 50. It should be appreciated that the process flow according to various exemplary embodiments of the present invention is not limited to the specific steps and sequence of steps shown in FIGS. 8A-8C, and other exemplary embodiments may involve any number of the same steps and/or different steps in the same sequence or in a different sequence in order to carry out aspects of the present invention.

As shown in Step S002, the personal user device 10 of the first user 12 may send an authentication request for the personal ad server 20. This step may include the personal ad server 20 sending instructions to the mobile application software 14 through the mobile application communication module 2034 to generate a graphical user interface window with fields allowing for entry of the user identification information. Upon receipt of the user identification information, the personal ad server 20 may compare the entered information with the user profile data 2014 to authenticate the user. If the information matches the stored identification information, then the personal ad server 20 may send instructions to the mobile application software 14 to generate appropriate graphical user interface windows allowing the user to access the user's personal account to generate a new posting, modify a previous posting, continue with a posting process, or perform any other actions. Otherwise, the personal ad server 14 may send instructions to the mobile application software 14 to request re-entry of the user identification information and/or request whether the user needs help in remembering the user identification information. If the user does not already have a personal account, the user may be requested to open a new account, including a request for entry of new user identification information.

In embodiments, a user may register with the system 1 through the user's pre-existing social media account (e.g., Facebook, Google, Twitter, LinkedIn, etc.). The user's personalized digital media items posted on the digital display system 50 may then be shared on the social media account with "friends" or other connections on the network.

In Step S004, after the first user 12 browses through the available categories and templates (e.g., as described previously in regards to FIGS. 9A-9C), the first user 12 may make a specific template selection. The personal user device 10 through the mobile application software 14 may then send a request for the selected template to the personal ad server 20. In response, the personal ad server 20 may send a request for the selected template to the digital signage API 30. In Step S006, the digital signage API may send the selected template to the personal ad server 20.

In Step S008, the personal ad server 20 may send the selected template received from the digital signage API to the personal user device 10. This step may include the personal ad server 20 sending instructions to the mobile application software 14 to generate appropriate graphical user interface windows to display the selected template, request the user to personalize the template and select one or more locations and times for display of the posting at available digital display systems 50 (e.g., as described previously in regards to FIGS. 9D-9I). This step may involve the mobile application software 14 receiving input from the user through the graphical user interface windows in the form of values for blank fields (e.g., from/to information, personalized messages, etc.), selection of items from drop-down menus, or through use of other interface tools, such as, for example, maps, calendars, and clocks, to name a few. The mobile application software 14 may access information from the personal ad server 20, such as map data 2022, display location data 2024 and personalized media template data 2010, and/or access such information stored locally by the mobile application software 14 on the personal user device 10, to generate content for display in the graphical user interface windows that allows the user to view nearby digital display systems 50 and select one or more of the systems 50 for display of the posting.

In Step S010, the personal user device 10 through the mobile application software 14 may send the selected template ID, values for the blank fields and visual elements entered in Step S008 to the personal ad server 20. This step may include the personal ad server 20 filtering content and/or formatting content to ensure that the personalized digital media item and other content intended for display with the personalized digital media item is safe and appropriate for the selected one or more digital display systems 50. In Step S012, the personal ad server 20 may send the selected template ID, the blank field values and the visual elements to the digital signage API 30.

In Step S0014, the digital signage API 30 may render a digital media item corresponding to the selected template ID, blank field values and visual elements. In this step, the digital signage API 30 may receive an HTML document from the personal ad server 20 corresponding to the selected template ID, blank field values and visual elements, and generate the personalized digital media item based on the HTML document. It should be appreciated that the document received from the personal ad server 20 may be received in other types of markup languages, such as, for example, ERB, Jinja2, XSLT, Markdown, Textile, or HAML, to name few.

In Step S016, the digital signage API 30 sends the rendered digital media item to the personal ad server 20. In Step S018, the personal ad server 20 sends the rendered digital media item received from the digital signage API 30 to the personal user device 10. In this step, the personal ad server 20 may send instructions to the mobile application software 14 to generate appropriate graphical user interface windows that allow the user to preview the personalized digital media item (e.g., as described in previously in regards to FIG. 9E). It should be appreciated that in other exemplary embodiments of the present invention, the personalized digital media item may be rendered at a system component other than the API 30. For example, the rendering may be performed at the personal ad server 20 and delivered to the personal user device 10 for preview, and the personal ad server 20 may send the rendered personalized digital media item to the digital signage API after a purchase request is made.

In Step S020, the personal user device 10 through the mobile application software 14 may send a request to purchase the personalized digital media item for posting on the selected one or more digital display systems 50, at the designated time, for the selected amount of time. This step may include the mobile application software 14 generating appropriate graphical user interface windows to allow the user to enter payment information (e.g., as previously described in regards to FIGS. 9J-9L) and post the electronic media item to the selected one or more digital display systems 50, at the designated time, for the selected amount of time. The mobile application software 14 may be configured to communicate with a payment service, such as, for example, an online payment system or a banking institution, as appropriate in order to process payment. In embodiments, after payment is taken on the personal user device 10, through the mobile application software 14, the payment service returns a valid token, placing a hold on the payment. The personal user device 10 through the mobile application software 14 may then send a purchase request for the selected post to the personal ad server 20. This request to the ad server 20 includes the payment token. The personal ad server 20 may then confirm that the token is valid and charge the amount for the given post.

In Step S022, the personal ad server 20 sends a takeover request to the digital signage API 30. In embodiments, the takeover request may include information in regards to identification of the one or more digital display systems 50 (e.g., location, system ID, etc.) selected for posting the personalized digital media item, time schedule of the posting (e.g., posting time and posting duration, to name a few), the personalized digital media item, and other commercial and/ or non-commercial digital media items requested for posting with the personalized digital media item. In embodiments, the commercial digital media items may be, for example, advertisements associated with products or services offered for sale. In embodiments, the non-commercial digital media items may be, for example, transportation schedule information (e.g., train schedule, bus schedule, etc.), or other types of public information. In Step S024, the digital signage API 30 sends the takeover request received from the personal ad server 20 to the digital signage control system 40.

In Step S026, the digital signage control system 40 generates content intended for display at the selected one or more digital display systems 50 based on the takeover request received from the digital signage API 30. The digital signage control system 40 may send the generated content to the selected one or more digital display systems 50, where the personalized digital media items may be displayed in accordance with the display schedule and locations.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

The invention claimed is:

1. A method for placing personalized content on one or more specified non-personal displays at a public or semi-public location using a personal digital device associated with a first user via a networked placement platform system comprising:
    (A) receiving, at the networked placement platform system from the personal digital device associated with the first user, a request to place personalized content on one or more non-personal displays, the request comprising:
        (i) a template associated with a selected digital media item;
        (ii) one or more personalized elements of the template;
        (iii) a selection of at least one of a time or duration to display the selected digital media item; and
        (iv) a selection of the one or more non-personal displays for display of the selected digital media item;
    (B) generating, at the networked placement platform system, a rendering of the personalized content based on the template and the one or more personalized elements;
    (C) analyzing, at the networked placement platform system, the rendered personalized content to determine whether to approve or reject the rendered personalized content;
    (D) upon the condition that the rendered personalized content is rejected, sending, by the networked platform placement system, a message to the personal digital device notifying the first user of the rejection;
    (E) upon the condition that the rendered personalized content is approved, generating, at the networked placement platform system, instructions for taking over the selected one or more non-personal displays to preempt pre-programmed content currently being displayed on the selected one or more non-personal displays and to display the approved personalized content in real-time or in accordance with a predetermined time schedule; and
    (F) sending, by the networked placement platform system, the instructions to the selected one or more non-personal displays for display of the approved personalized content in real-time or in accordance with the predetermined time schedule.

2. The method of claim 1, wherein the request of step (A) further comprises confirmation of payment by the first user for placement of the personalized content.

3. The method of claim 1, wherein the one or more personalized elements comprise visual elements.

4. The method of claim 3, wherein the visual elements comprise one or more of the following: text, digital stickers, emojis, images, and GIFs.

5. The method of claim 4, wherein visual characteristics of the visual elements are customizable.

6. The method of claim 5, wherein the visual characteristics comprise at least one of font type, font size, size of other visual elements, and color scheme.

7. The method of claim 1, wherein the step (C) of analyzing, at the networked placement platform system, the rendered personalized content to determine whether to approve or reject the rendered personalized content comprises:
    (i) accessing, by the networked placement platform system, a database of acceptable criteria associated with at least one of content and format; and
    (ii) comparing, by the networked placement platform system, the rendered personalized content to the acceptable criteria.

8. The method of claim 1, further comprising the steps of:
    (G) generating, by the networked placement platform system, location data associated with the one or more non-personal displays; and
    (H) providing, by the networked placement platform system, to mobile application software at the personal digital device, the location data for selection of the one or more non-personal displays for display of the selected digital media item.

9. The method of claim 8, wherein the step (G) of generating, by the networked placement platform system, location data associated with the one or more non-personal displays comprises:
    (i) receiving, at the networked placement platform system, user location data associated with the personal digital device and accessed by the mobile application software; and
    (ii) comparing, by the networked placement platform system, the user location data with location data associated with a plurality of non-personal displays within a network of non-personal displays.

10. The method of claim 9, wherein the user location data comprises at least one of latitude and longitude, Geohash, and positional coordinates associated with the personal digital device.

11. The method of claim 9, wherein the user location data is accessed from a data provider.

12. The method of claim 11, wherein the user location data comprises at least one of real-time network usage data, sensor collected data, application-derived user location data, and purchased third-party location data.

13. The method of claim 1, wherein the step (B) of generating, at the networked placement platform system, a rendering of the personalized content based on the template and the one or more personalized elements comprises generating the rendering based on a markup language document.

14. The method of claim 13, wherein the markup language is HTML, ERB, Jinja2, XSLT, Markdown, Textile or HAML.

15. The method of claim 1, further comprising the step of generating for display, at the personal digital device, a graphical user interface, wherein the graphical user interface is configured to:
   (i) display a plurality of available templates from which the template may be selected;
   (ii) receive as input to the selected template one or more personalized elements of the template;
   (iii) receive as input a selection of an amount of at least one of a time or duration to display the selected digital media item; and
   (iv) receive as input a selection of the one or more non-personal displays for display of the selected digital media item.

16. The method of claim 1, wherein the predetermined time schedule comprises an amount of time to delay display of the approved personalized content after receipt of the display instructions.

17. The method of claim 1, wherein the predetermined time schedule comprises an amount of time during which the approved personalized content is to be displayed.

18. The method of claim 1, further comprising the step of sending, by the networked placement platform system, to the personal digital device, confirmation that the personalized content has been displayed on the selected one or more non-personal displays.

19. The method of claim 1, wherein the request comprises a selection of a time to display the selected digital media item.

20. The method of claim 1, wherein the request comprises a selection of a duration to display the selected digital media item.

21. The method of claim 1, wherein the request comprises a selection of a time and duration to display the selected digital media item.

* * * * *